United States Patent [19]

Hartig

[11] Patent Number: 4,514,806
[45] Date of Patent: Apr. 30, 1985

[54] HIGH SPEED LINK CONTROLLER WRAPAROUND TEST LOGIC

[75] Inventor: Kent H. Hartig, Hudson, Mass.

[73] Assignee: Honeywell Information Systems Inc., Waltham, Mass.

[21] Appl. No.: 431,860

[22] Filed: Sep. 30, 1982

[51] Int. Cl.³ ............................................. G06F 11/00
[52] U.S. Cl. ................................................. 364/200
[58] Field of Search .................. 364/200, 900; 371/51, 371/16

[56] References Cited

U.S. PATENT DOCUMENTS

| | | | |
|---|---|---|---|
| 3,566,093 | 2/1971 | Joyce et al. | 371/51 |
| 3,831,148 | 8/1974 | Greenwald et al. | 364/200 |
| 4,019,033 | 4/1977 | Parmet | 371/51 |
| 4,038,537 | 7/1977 | Cassarino, Jr. et al. | 371/51 |
| 4,048,481 | 9/1977 | Bailey, Jr. et al. | 364/200 |
| 4,159,534 | 6/1979 | Getson, Jr. et al. | 364/200 |
| 4,334,307 | 6/1982 | Bourgeois et al. | 364/200 |
| 4,335,425 | 6/1982 | Goto et al. | 364/200 |
| 4,335,426 | 6/1982 | Maxwell et al. | 364/200 |

Primary Examiner—Gareth D. Shaw
Assistant Examiner—Jameson Lee
Attorney, Agent, or Firm—George Grayson; Nicholas Prasinos

[57] ABSTRACT

An interactive terminal system includes a high speed link controller (HSLC) and a number of work stations, all coupled in common to a single conductor coaxial bus. The HSLC includes apparatus controlled by a microprocessor to put the HSLC in a wraparound test mode. The microprocessor transfers test bytes which pass through the HSLC logic and are checked by the microprocessor.

6 Claims, 20 Drawing Figures

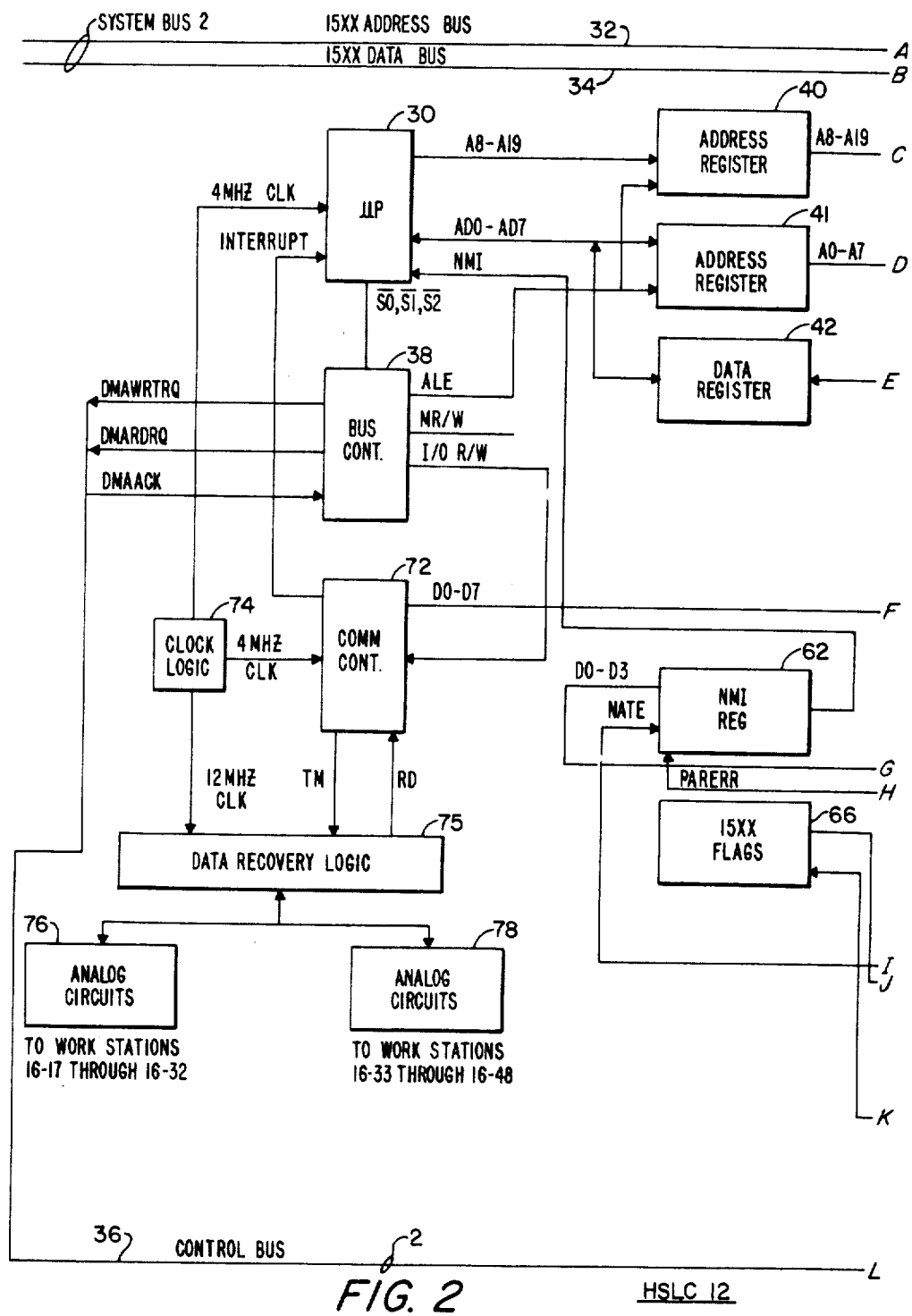
FIG. 2  HSLC 12

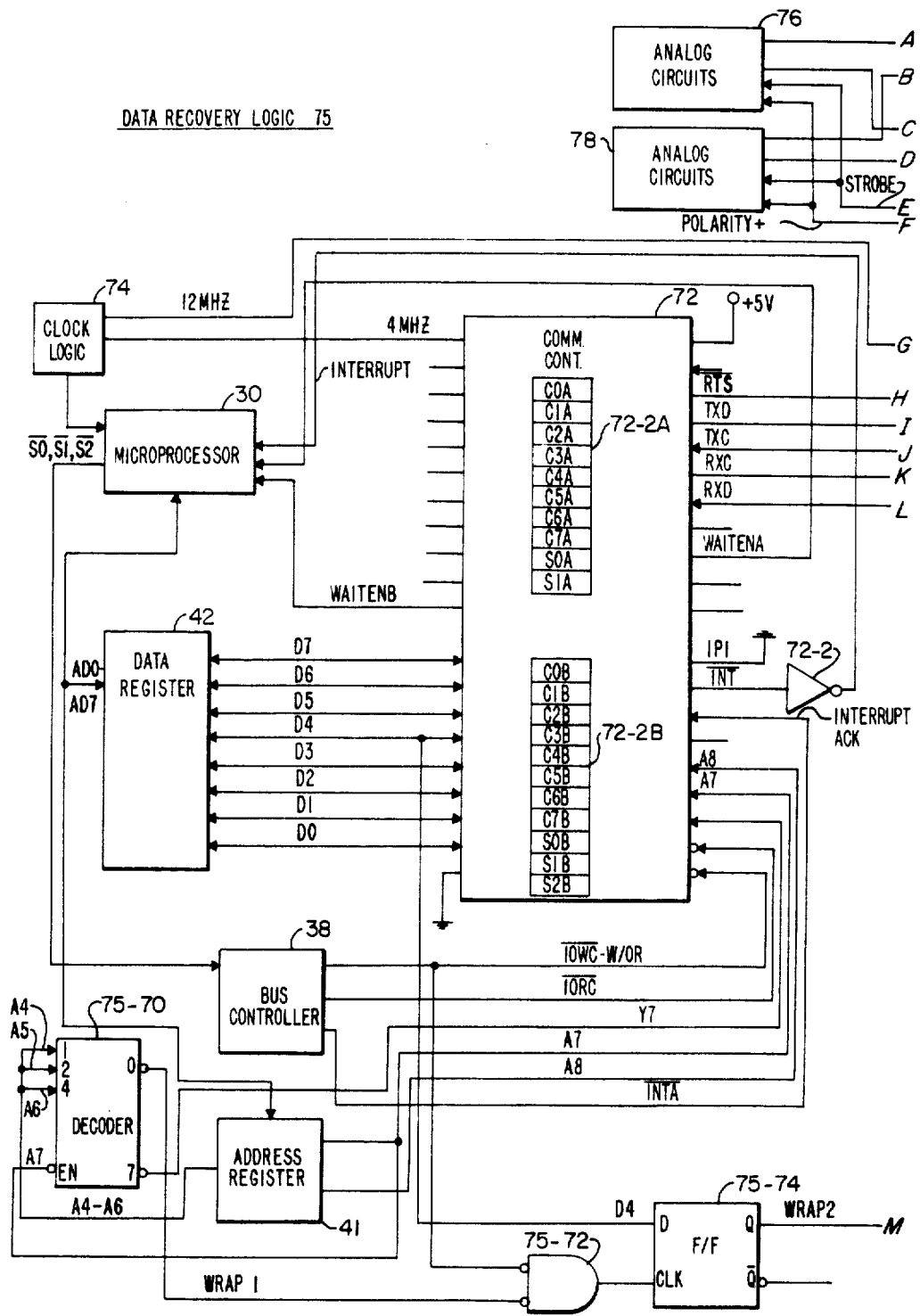
FIG. 4 SHEET 1 OF 3

DATA RECOVERY LOGIC 75

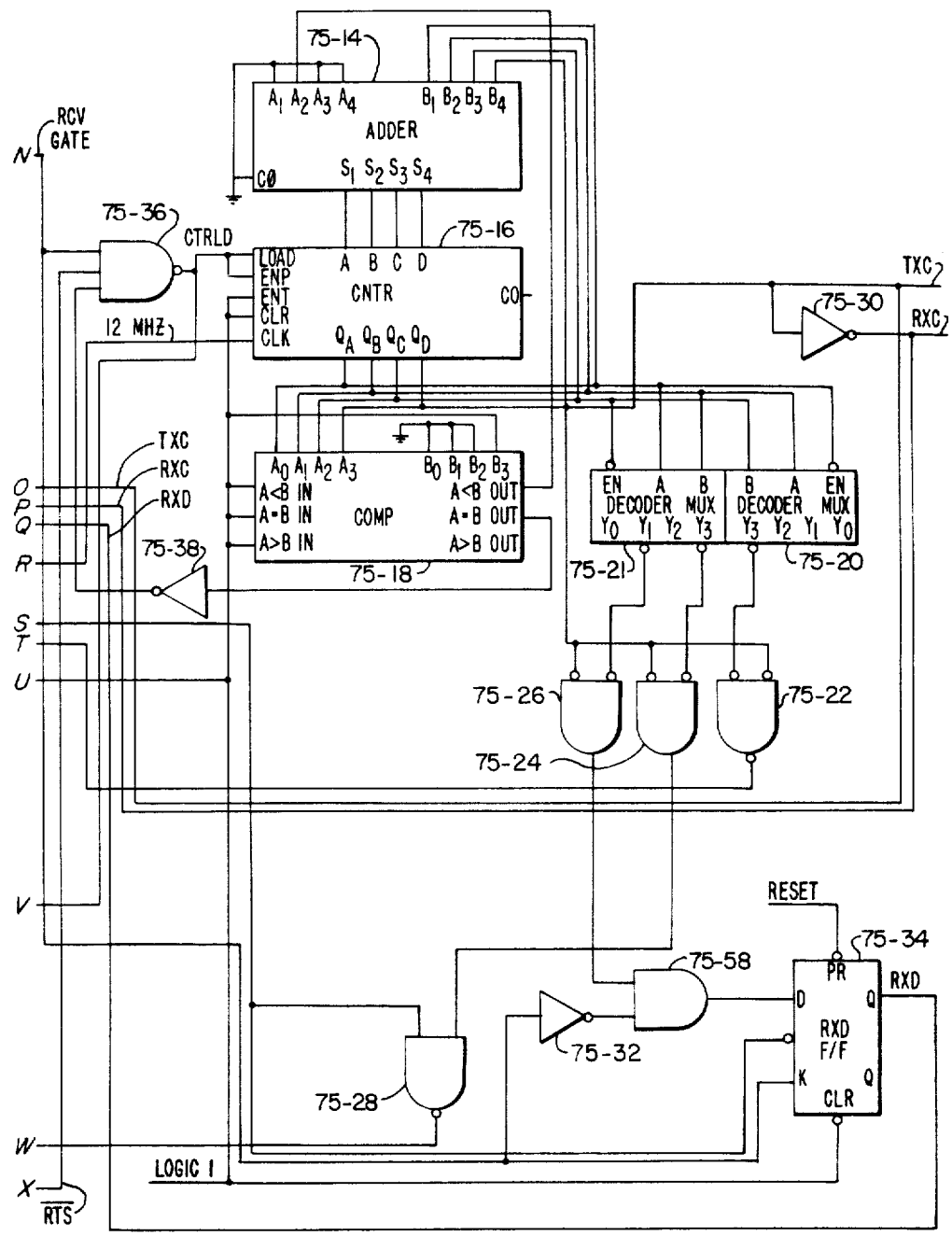
FIG. 4 SHEET 3 OF 3

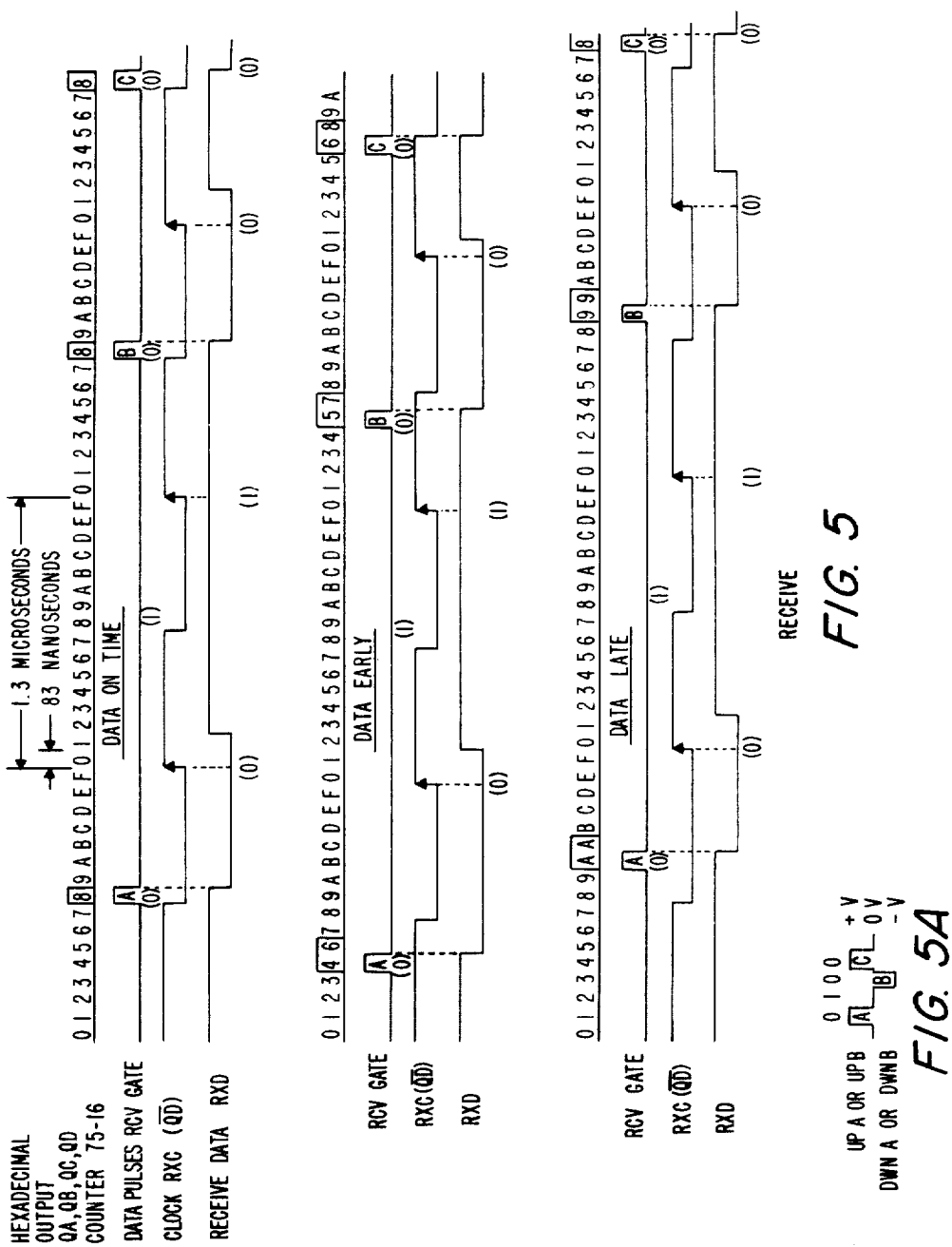

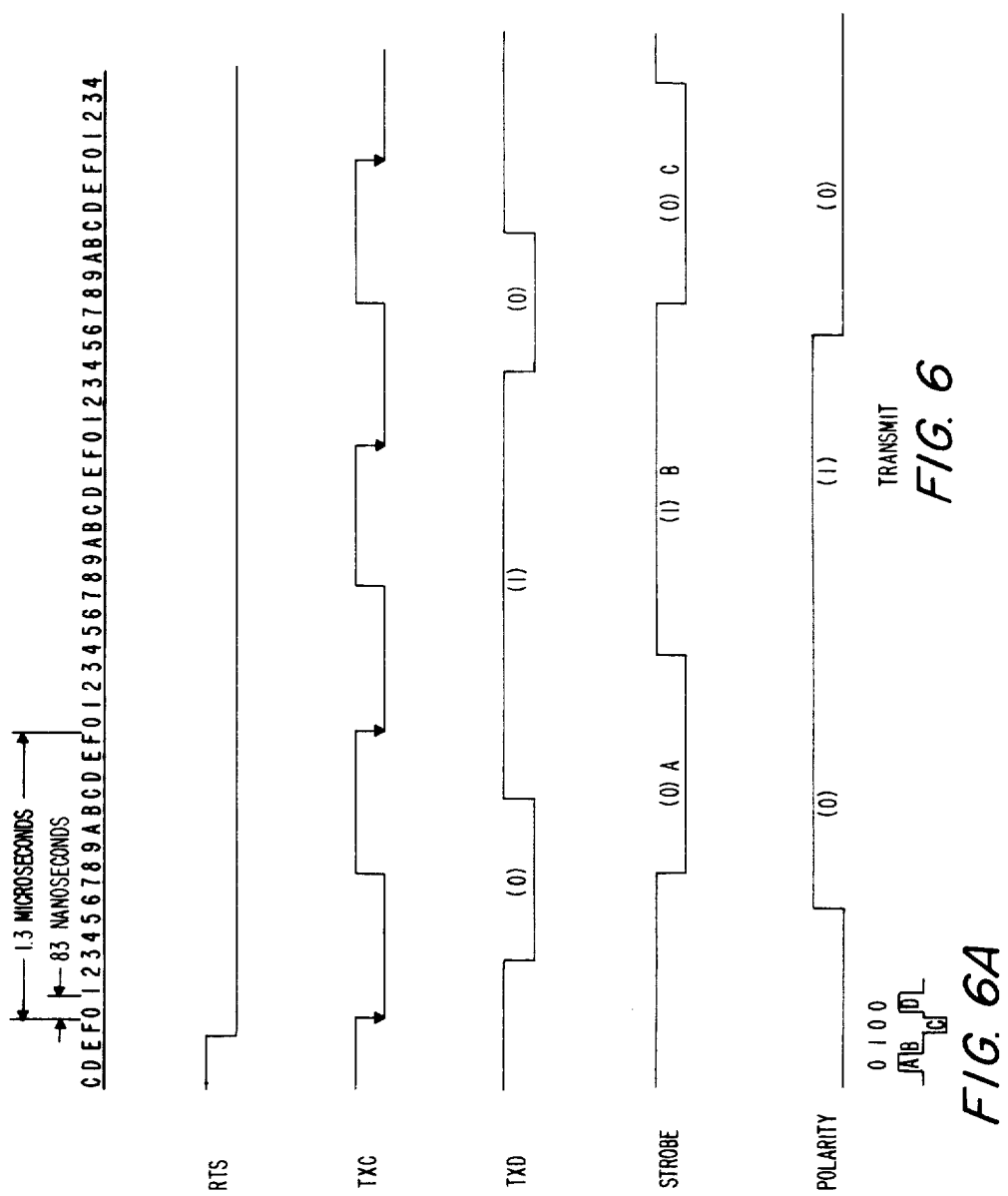

TRANSMIT

RECEIVE a) $V1 = $ STEP FUNCTION b) $R = RA = RB = RC$ c) $d = $ DELAY TIME OF STUB (FUNCTION OF LENGTH OF STUB)

d) P(REFLECTION COEFFICIENT)
$$= \frac{\left(\frac{1}{\frac{1}{R}+\frac{1}{R}}\right)-R}{\left(\frac{1}{\frac{1}{R}+\frac{1}{R}}\right)+R} = -\frac{1}{3}$$

e) $V2(\text{TIME } 0d) = P \times V1 = -\frac{1}{3}V1$ f) $V2(\text{TIME } 2d) = -\frac{1}{3}V1 + V4(1-P) = \frac{1}{9}V1$ SINCE $V3=V4$ AND $V3=V1+V2=\frac{2}{3}V1$ g) $V1 = $ RAMP OF DURATION $8d$
$= \frac{1}{2}V1 (\text{DURATION } 4d) + \frac{1}{2}V1(\text{DURATION } 4d)$ h) $V2(\text{TIME } 0d) = P \times \frac{1}{2}V1 = -\frac{1}{6}V1$ i) $V2(\text{TIME } 2d) = \frac{1}{9} \times \frac{1}{2}V1 = \frac{1}{18}V1$

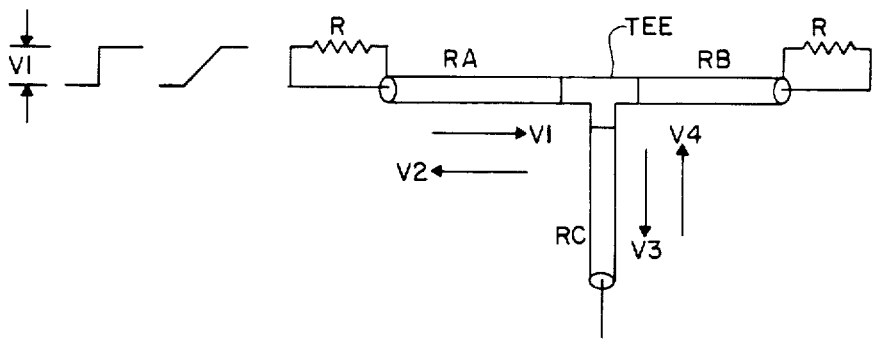

FIG. 11A

LOOPBACK TEST

HIGH SPEED LINK CONTROLLER WRAPAROUND TEST LOGIC

RELATED APPLICATIONS

The following U.S. patent applications are assigned to the same assignee as the instant application, are related to the instant application and are incorporated herein by reference.

1. "Digital Serial Interface with Receive Logic" by Gary J. Goss, Robert G. H. Moles and Randall D. Heinrichs, filed on Sept. 23, 1981, and having U.S. Ser. No. 304,754.
2. "Digital Serial Interface with Encode Logic for Transmission" by Gary J. Goss, Robert G. H. Moles and Randall D. Heinrichs, filed on Sept. 23, 1981, and having U.S. Ser. No. 304,755.
3. "Digital Serial Interface with Decode Logic" by Gary J. Goss, Robert G. H. Moles and Randall D. Heinrichs, filed Sept. 23, 1981, and having U.S. Ser. No. 304,756 which was abandoned and a continuation filed on Jan. 10, 1984 and having U.S. Ser. No. 568,933.

The following U.S. patent applications filed on an even date with the instant application and assigned to the same assignee as the instant application are related to the instant application and are incorporated herein by reference.

1. "Work Stations Coupled to a Communications Controller by a High Speed Serial Bus" by Ervin Forbes, Jerry L. Falk, Kent H. Hartig and Robert G. H. Moles, filed on Sept. 30, 1982 and having U.S. Ser. No. 431,915.
2. "Apparatus for Synchronizing a Stream of Data Bits Received over a Single Coaxial Conductor" by Thomas J. Rey and Ervin Forbes, filed on Sept. 30, 1982 and having U.S. Ser. No. 431,410.
3. Apparatus for Generating High Speed Signals over a Single Conductor Coaxial Bus" by Fred A. Mirow and Matthew M. Quinones, filed on Sept. 30, 1982 and having U.S. Ser. No. 431,914.
4. "The Connection of a Number of Work Stations to a Single Conductor Coaxial Bus" by Matthew M. Quinones, Fred A. Mirow and Robert M. Troup, filed on Sept. 30, 1982 and having U.S. Ser. No. 431,862.
5. "An Interactive Terminal System Using a Prepoll Prior to Transferring Information from the Controller to the Work Station" by George E. Kelley, Jr., filed on Sept. 30, 1982 and having U.S. Ser. No. 431,409.

BACKGROUND OF THE INVENTION

1. Field of the Invention

This invention relates generally to a system wherein information is transferred between a communications controller and a number of work stations, each of which may include a keyboard and a cathode ray tube display; and more particularly to apparatus for testing the data recovery logic of the communications controller.

2. Description of the Prior Art

As the semiconductor industry induces more complex and higher speed logic elements, data processing systems designed using these elements perform more complex logic functions and have higher systems throughput than data processing systems designed in the past. Many of the data processing systems are made up of microprogram controlled subsystems coupled in common to a system bus. Diagnostic testing systems have been developed for such microprogrammed data processing systems to check out each of the subsystems coupled to the system bus from a central source. U.S. Pat. No. 4,159,534 entitled "Firmware/Hardware System for Testing Interface Logic of a Data Processing System" describes a typical diagnostic test. This type of diagnostic test unfortunately makes it difficult to isolate a particular error. It is possible that the error is caused by a malfunction of the central source: the system bus, a subsystem that was not addressed, or a subsystem that was addressed.

Microprogrammed subsystems are designed with the capability to perform diagnostic tests independently of the remainder of the data processing system to which the subsystems are coupled. U.S. Pat. No. 4,019,033 entitled "Control Store Checking System and Method" describes a diagnostic system which verifies that the parity logic associated with each register tested has valid parity. This type of diagnostic tests the parity of each register in turn which receives predetermined data. Also the diagnostic does not force bad parity into the system to assure that the bad parity is detected.

U.S. Pat. No. 3,566,093 entitled "Diagnostic Method and Implementation for Data Processors" describes the use of the parity error signal in a diagnostic routine for signalling erroneous access to a memory location or to provide a distinctive synchronization signal for test equipment while the memory is sided through a loop including locations under test.

U.S. Pat. No. 3,518,513 entitled "Apparatus for Checking the Sequencing of a Data Processing System" describes a diagnostic system in which a count of a number of cycles for a microprogram to reach a particular state is compared with the actual count of the number of cycles it took to reach that state.

U.S. Pat. No. 3,831,148 entitled "Nonexecute Test Apparatus" describes self-testing of a processing system under microinstruction control using parity checking apparatus.

U.S. Pat. No. 4,048,481 entitled "Diagnostic Testing Apparatus and Method" describes apparatus which is operative to condition data recovery to receive blocks of synchronization and data patterns arranged in a predetermined format to simulate data transfer from a peripheral device.

U.S. Pat. No. 4,038,537 entitled "Apparatus for Verifying the Integrity of Information Stored in a Data Processing System Memory" describes apparatus for adding together a column of bits including a parity bit in each bit location of a memory having a plurality of word locations, and comparing each sum with a predetermined parity bit of a parity word in one of the word locations.

OBJECTS OF THE INVENTION

It is accordingly a primary object of the invention to provide an improved interactive terminal system.

It is an object of the invention to provide a high speed link controller that can be readily verified.

It is another object of the invention to provide apparatus for easily verifying the data recovery logic of the high speed link controller.

SUMMARY OF THE INVENTION

A high speed link controller (HSLC) includes a read only memory for storing a wraparound test microprogram and a microprocessor responsive to microwords of the test microprogram for generating a sequence of data bytes.

The microprocess puts the HSLC in a wraparound test mode by setting a flop 75-74 and transferring test data byte signals to the communications controller which transmits the data signals over the transmit signal line TXD and generates the receive clock signal RXC.

A strobe flop 75-44 and a polarity flop 75-42 are responsive to the data signals received over the TXD signal line for generating a STROBE signal for each binary ZERO bit and a POLARITY signal for alternate binary ZERO bits. The strobe flop is set on the rise of the RXC clock signal.

The output signal WRAP2 from flop 75-74 conditions switch 75-50 to apply the POLARITY and STROBE signals through the synchronization logic to the receive flop 75-34. The output RXD signal transfers the serial stream of data signals to the communications controller where it is reassembled into bytes for transfer to the microprocessor. The microprocessor verifies that the byte received via the RXD signal is equal to the byte sent to the communications controller.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 5 is a timing diagram of the receive operation;

FIGS. 5A and 6A show the waveshape of consecutive binary bits.

FIG. 6 is a timing diagram of the transmit operation;

FIG. 9A is a voltage waveshape timing diagram of the transmitter output signal;

FIG. 11A shows the calculations of the reflection voltages;

DESCRIPTION OF THE PREFERRED EMBODIMENT

Figure 1:
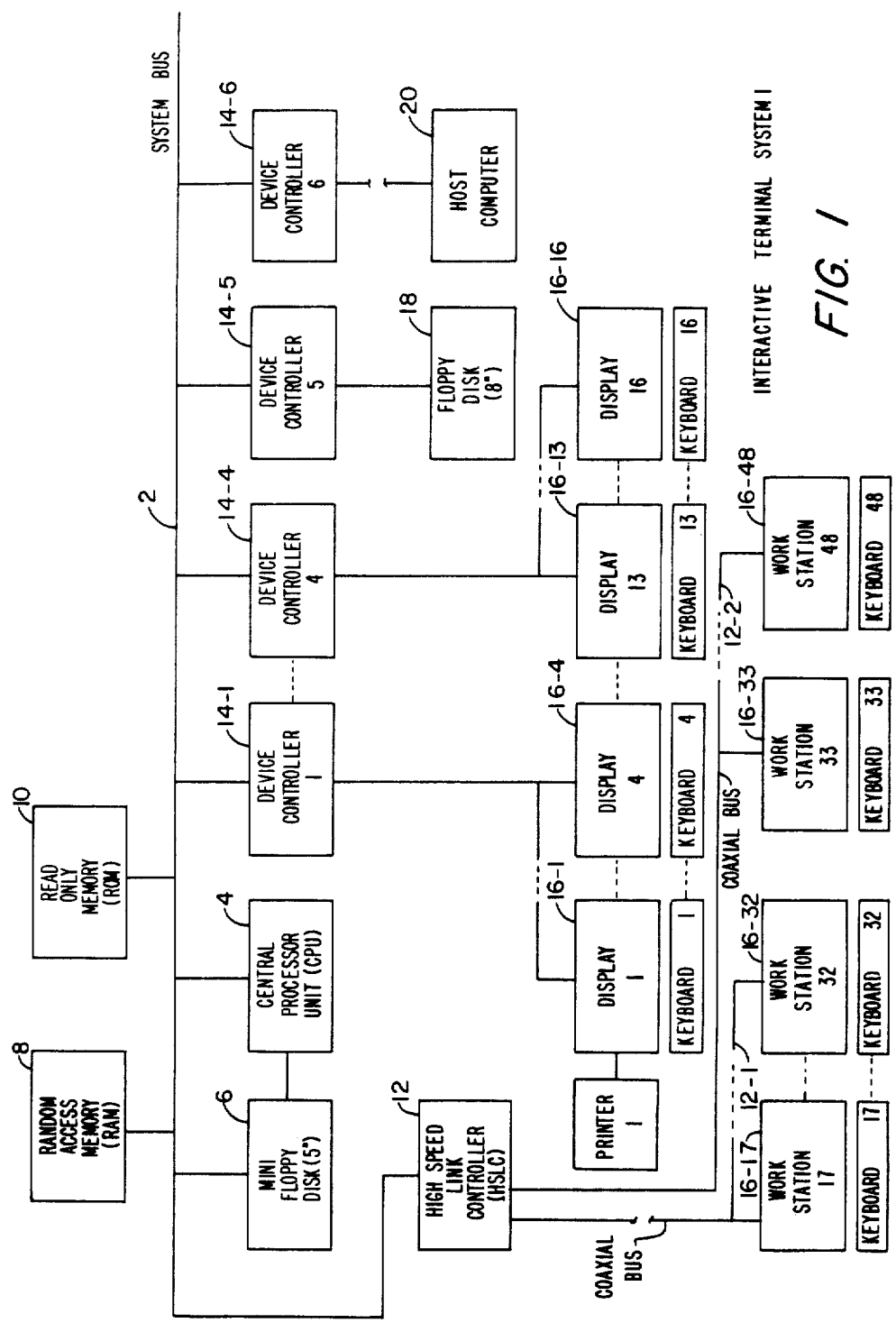
FIG. 1 is a block diagram of the interactive terminal data processing system.

FIG. 1 shows a block diagram of a typical multiapplication interactive terminal system 1. Operators seated at work stations may input information into the system via keyboards and receive requested information from the system via cathode ray tube (CRT) displays. A work station includes a keyboard and a display, and a printer if required by the application. The typical system of FIG. 1 may have 48 work stations, work station 1 and keyboard 1 16-1 through work station 48 and keyboard 48 16-48. Note that printer 16-1A is included in the work station 16-1. Four work stations are coupled to each device controllers 14-1 through 14-4 for a total of 16 work stations 16-1 through 16-16, and 32 work stations 16-17 through 16-48 are coupled to a high speed link controller (HSLC) 12. The HSLC 12 is coupled to work stations 16-17 through 16-32 by a bus 12-1 and coupled to work stations 16-33 through 16-48 by a bus 12-2. The maximum length of buses 12-1 and 12-2 is one kilometer.

An 8 inch floppy disk 18 stores data pertinent to the application for which system 1 is used. As an example, when system 1 is used in a financial application, the floppy disk 18 may store information about customer accounts and recent transactions prior to transmission to the host. Floppy disk 18 is coupled to disk controller 14-5.

A host computer 20 may couple system 1 to a communication network for enabling communication with other terminal systems or other host computers in the network. Host computer 20 is coupled to device controller 14-6.

Work stations 16-1 through 16-16 share common logic in device controllers 14-1 through 14-4 whereas work stations 16-17 through 16-48 each contain all of the logic necessary to perform the work station function. They do not share common logic.

Device controllers 14-1 through 14-6 and HSLC 12 are coupled in common to a system bus 2 as are a central processor (CPU) 4, a random access memory (RAM) 8 and a read only memory (ROM) 10. Note that the interactive terminal system 1 is not limited to these devices.

The HSLC 12 controls the transfer of information between one of the work stations 16-17 through 16-48 and a device coupled to system bus 2. Information transfers at 750 kilobits per second.

RAM 8 may store the operating system software, processor stack addresses and application programs. ROM 10 may store diagnostic programs for debugging system 1, programs for initializing system 1 during the "Power On" sequence as well as application programs.

CPU 4 controls the operation by generating the system bus 2 timing cycles. The CPU 4 generates direct memory access (DMA) cycles and CPU cycles. During a DMA cycle, a device such as the HSLC 12 may communicate with RAM 8 by the HSLC 12 sending address signals over system bus 2 to RAM 8 and receiving during the DMA cycle a data byte which was stored in the RAM 8 address location over system bus 2. The CPU 4 also establishes system bus 2 cycle priorities. The RAM 8 chip refresh cycle has the highest priority. Next in priority is the system bus 2 cycle called a DMA cycle for transferring information between RAM 8, ROM 10 or device controllers 14-1 through 14-4 and one of the device controllers 14-5 through 14-6 or HSLC 12. Following in priority is a screen refresh cycle for the CRT's of display 1 16-1 through display 16 16-16. The CPU 4, which is operative during CPU cycles, has the lowest system bus 2 cycle priority. The CPU 4 is also responsive to instructions received from RAM 8 or ROM 10 for typically controlling the interactive terminal system 1 operation including branching to error routines, processing interrupts, and performing diagnostic routines as well as application programs.

Figure 2:
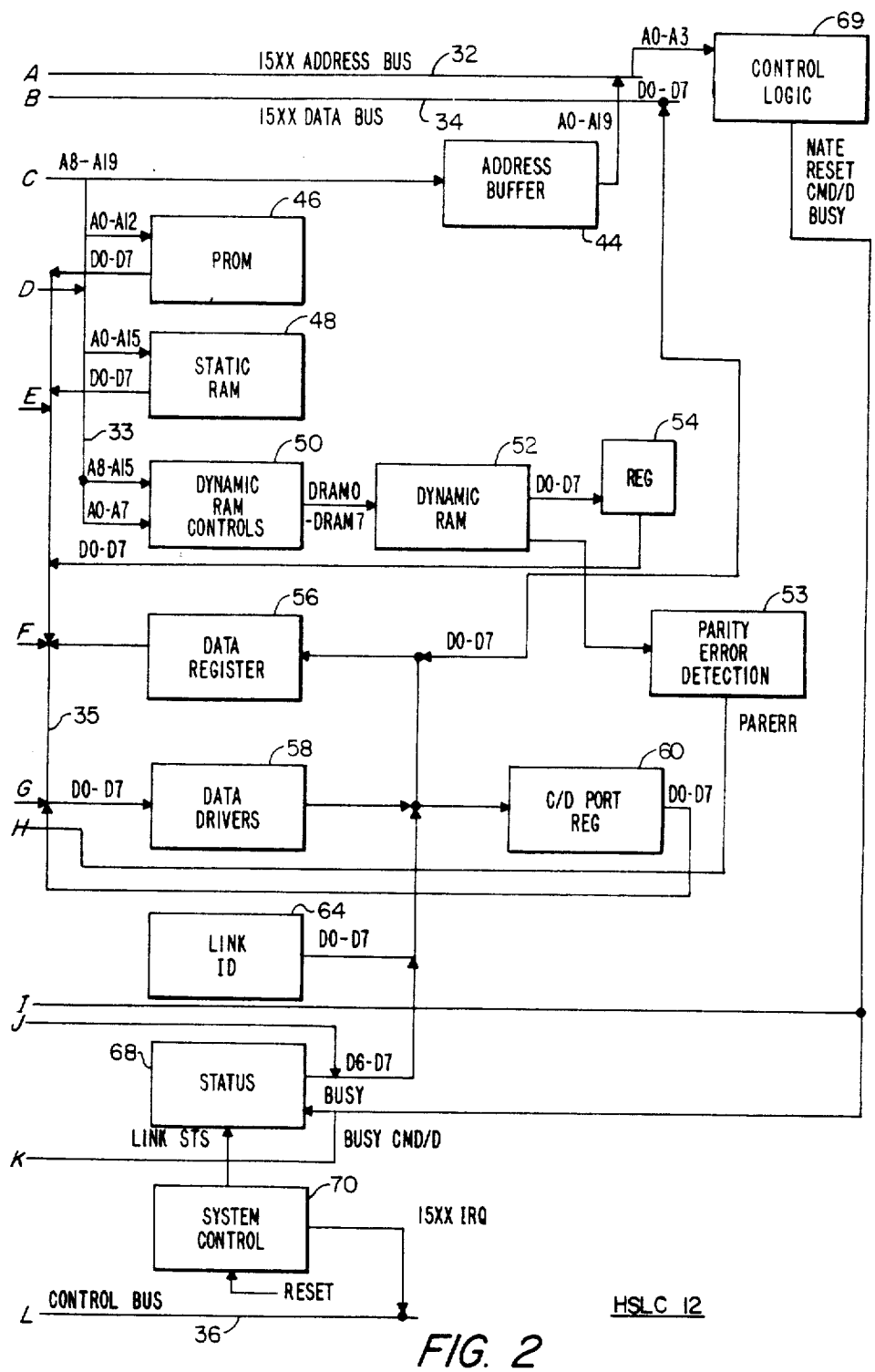
FIG. 2 is a block diagram of the high speed link control (HSLC)

FIG. 2 shows a block diagram of the HSLC 12 whose primary function is to transfer data byte signals D0 through D7 between one of the devices coupled to system bus 2 and the work stations 16-17 through 16-48, one work station at a time, via a data bus 34 of system bus 2. A multiprotocol serial communications controller 72 communicates with work stations 16-17 through 16-32 via analog circuits 76 and data recovery logic 75; and communicates with work stations 16-33 through 16-48 via analog circuits 78 and data recovery logic 75.

Communications controller 72 is a μPD7201 Multiprotocol Serial Communications Controller described in the "Data Communications μPD72001 Technical Manual" published by NEC Electronics U.S.A. Inc., Microcomputer Division, One Natick Executive Park, Natick, Mass. 01760.

Data byte signals D0 through D7 are transferred between work stations 16-17 through 16-48 and a dynamic random access memory (RAM) 52, and between dynamic RAM 52 and RAM 8. RAM 52 may receive data byte signals D0 through D7 from ROM 10.

A microprocessor 30 controls the transfer of data byte signals D0 through D7 in the HSLC 12. For transferring the first of a block of data byte signals D0 through D7 stored in dynamic RAM 52 to a selected work station 16-17 through 16-48, the microprocessor 30 transfers address signals AD0 through AD7 to an address register 41 and address signals A8 through A15 to an address register 40. Output signals A0 through A7 from address register 41 and address signals A8 through A15 from address register 40 are applied to the input terminals of a dynamic RAM controller 50 from address register 42. The dynamic RAM controller 50 multiplexes address signals A0 through A7 and A8 through A15 to generate signals DRAM0 through DRAM7 which address dynamic RAM 52 on 2 8-bit cycles to effect a 16-bit address. The addressed data byte D0–D7 is stored in a register 54 for transfer communications controller 72. Microprocessor 30 applies status signals $\overline{S0}$, $\overline{S1}$ and $\overline{S2}$ to a bus controller 38 to generate an I/O W signal which is applied to and results in the communications controller 72 receiving the data byte signals D0 through D7 for transfer to work stations 16-17 through 16-48. Microprocessor 30 generates successive addresses to transfer a block of data byte signals D0 through D7, the first byte identifying the work station receiving the block of data byte signals D0 through D7.

The bus controller 38 generates a memory read signal and a memory write signal shown as signals M R/W that enable the various memories, PROM 46, static RAM 48 and dynamic RAM 52. Bus controller 38 also generates an I/O write signal and an I/O read signal shown as signals I/O R/W to enable the various registers, link ID 64, status 68, system control 70, C/D port register 60, NMI register 62 and 15XX flags 66.

Microprocessor 30 is an Intel 8088 microprocessor described in "The 8086 Family Users Manual, October, 1979" published by Intel Corporation, 3065 Bowers Avenue, Santa Clara, Ca. 95051.

Data byte signals D0 through D7 are transferred from dynamic RAM 52 to RAM 8 under microprocessor 30 control during the DMA cycle. Under microprocessor 30 control, bus controller 38 generates a DMA write request DMAWRTRQ signal on a control bus 36 of system bus 2. CPU 4 is responsive to the DMAWRTRQ signal and generates a DMA acknowledge DMAACK signal giving the HSLC 12 access to system bus 2. Address signals A0 through A7 from address register 41 and address signals A8 through A15 from address register 40 generated by microprocessor 30 select data byte signals D0 through D7 from dynamic RAM 52 via dynamic RAM controller 50 and are stored in register 54 for transfer to data bus 34 via data drivers 58. Also, microprocessor 30 generates the RAM 8 memory address signals A0 through A19 for storage in address registers 40 and 41. The data byte signals D0 through D7 are transferred to RAM 8 from data register 54 via data bus 58 over data bus 34 of system bus 2 and the address signals A0 through A19 are transferred through address buffer 44 to RAM 8 via address bus 32 of system bus 2.

The HSLC 12 receives data bytes from RAM 8 for storage in dynamic RAM 54 under microprocessor 30 control. Status signals $\overline{S0}$, $\overline{S1}$ and $\overline{S2}$ applied to bus controller 38 generate the DMA read request DMARDRQ signal. The CPU 4 is responsive to the DMARDRQ signal to generate the DMA acknowledge signal DMAACK again giving the HSLC 12 access to system bus 2. Microprocessor 30 loads address registers 40 and 41 with the RAM 8 address location of the requested data byte which is sent out an address bus 32 as signals A0 through A19. The data byte from RAM 8 is received over data bus 34 and stored in a register 56. Microprocessor 30 loads the address registers 40 and 41 with the dynamic RAM 52 address location into which the data byte stored in register 56 is written. The data byte in register 56 is then stored in dynamic RAM 52 at the address location signals A0 through A15 stored in address registers 40 and 41.

The programmable read only memory (PROM) 46 stores a bootstrap routine, which is operative during the system initialization operation to store program information into static RAM 48 and dynamic RAM 52. PROM 46 may also store the firmware that operates with the microprocessor 30 and also store diagnostics for testing the HSLC 12.

Static RAM 48 stores the interrupt vectors which indicate to the microprocessor which of the possible conditions within the HSLC 12 is interrupting the microprocessor 30. Static RAM 48 also provides firmware workspace during the execution of firmware programs by microprocessor 30.

The HSLC 12 contains three types of registers: registers that interface to the system bus 2, registers that interface to the HSLC 12 data bus 35, and registers that interface with both the system bus 2 and HSLC 12 data bus 35 and address bus 32.

In response to a command from CPU 4 for the HSLC 12 identification code, the HSLC 12 sends the output signals D0 through D7 of a link ID 64 over data bus 34 to CPU 4. This allows CPU 4 to verify the identity of the HSLC 12 during the system initialization operation.

A control logic 69 receives address signals A0 through A3 from the CPU 4 via address bus 32 to generate a number of signals. Signal NATE causes a nonavailable trap interrupt; that is, the HSLC 12 did not respond during a firmware debugging or maintenance operation and tried to reinitialize the HSLC 12. Signal RESET indicates that the HSLC 12 communication with the CPU 4 is not reestablished during the firmware debugging or maintenance operation and reinitializes the HSLC 12. Signal CMD/D indicates a command byte or a data byte is stored in a C/D port register 60. Signal BUSY indicates that the CPU 4 found the C/D port register 60 full, that is, an indication that the HSLC 12 has not yet processed the last command or data byte received from CPU 4.

Signal NATE is applied to a NMI register 62 to generate a nonmaskable interrupt (NMI) signal to microprocessor 30. Signals CMD/D and BUSY are transferred to data signal lines D6 and D7 respectively by 15XX flags 66.

System control 70 generates an interrupt request signal 15XX IRQ to indicate to CPU 4 that the HSLC 12 is sending information to CPU 4, and generates a LINK STS signal to the 15XX that the HSLC 12 is either waiting for a command or processing a current command. A typical command would be to poll one of the work stations 16-17 through 16-48.

Status 68 places the BUSY and LINK STS signals on data signal lines D6 and D7 respectively, indicating the status of the C/D port register 60 as empty or full.

The RESET signal clears control logic 69, clears any requests the HSLC 12 is making of a DMA system bus 2 cycle, and restarts the microprocessor 30 to the initialization firmware sequence.

Parity error detection 53 generates a parity error signal PARERR when sensing a parity error in dynamic RAM 52. Signal PARERR is stored in NMI register 62 which generates the NMI signal to interrupt microprocessor 30. The microprocessor may then branch to a firmware routine to continue the HSLC 12 operation. The firmware makes a determination as to whether to continue utilizing the questionable RAM 52.

The C/D port register 60 is loaded with a data byte or a command byte from the CPU 4. The CPU 4 senses the busy bit of status 68 to assure that the HSLC 12 is responsive to receive the data byte or command byte.

The NMI register 62 stores indications of a dynamic RAM 52 parity error, the number of address locations of PROM 46 and dynamic RAM 52, and a nonavailable trap event (NATE) signal sent from the CPU 4 to the HSLC 12 indicating that the HSLC 12 is not responding to CPU 4 commands during system initialization or a maintenance operation. The parity error signal and NATE signal generate a nonmaskable interrupt (NMI) signal to the microprocessor 30 which can immediately branch to a maintenance firmware routine.

Data line signal D0 from NMI register 62 indicates a parity error, signal D1 indicates a nonavailable trap event (NATE), signal D2 indicates a PROM 46 option and signal D3 indicates a dynamic RAM 52 option.

Figure 3A:
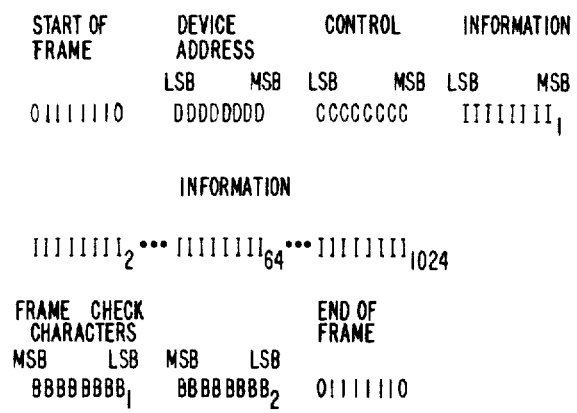
FIG. 3A shows the information transferred between the HSLC and the work stations.

Referring to FIG. 3, the HSLC 12 uses a bit oriented protocol which utilizes a frame structure for information interchange between the HSLC 12 and the work stations 16-17 through 16-48. Information transferred from communications controller 72 to the work stations 16-17 through 16-48 is contained in frames, each frame starting and ending with the hexadecimal 7E (binary 0111 1110) byte. Hexadecimal 7E is a unique byte code. Since data could contain the hexadecimal 7E pattern, the communications controller 72, after transmitting five consecutive binary ONE's, inserts a binary ZERO. The receiver, one of the work stations 16-17 through 16-48, deletes the first binary ZERO that follows five consecutive binary ONE bits. The communications controller 72 can distinguish between hexadecimal 7E as a flag or as a data character.

Following the start of frame character hexadecimal 7E is an 8-bit device address DDDD DDDD. Each of the work stations 16-17 through 16-48 is assigned a unique 8-bit address code to which it responds. Valid addresses are from hexadecimal 01 (binary 0000 0001) through hexadecimal FF (binary 1111 1111). Hexadecimal FF is termed the "global" address, that is, all work stations 14-17 through 14-48 as well as the HSLC 12 will respond to this address. An address of hexadecimal 00 is ignored. All work stations 16-17 through 16-48 in addition to responding to their original address respond to the hexadecimal FF address thereby permitting the HSLC 12 to broadcast a common message.

The 8 control bits (CCCC CCCC) appear in all frames to define the type of frame sent between the HSLC 12 and the work stations 16-17 through 16-48. The frame types are an information (I) frame, a supervisory (S) frame, and an unnumbered (U) frame.

The information field bytes (IIII IIII)$_1$ through (IIII IIII)$_{1024}$, a maximum of 1024 bytes, appear only in the I frame. The HSLC 12 does not generate an information field for the S or U frame.

The 2 byte frame sequence bits (BBBB BBBB) and (BBBB BBBB) provide cyclic check bytes for the frame. Excluded in the calculation for the cyclic check bytes are the binary ZERO's added after each five successive binary ONE bits.

The S frame transfers supervisory commands such as "Test for work station busy" or "Acknowledge I frames".

The U frame commands are sent by the HSLC 12 to the work stations 16-17 through 16-48. Typical U frame commands result in the addressed work station sending back configuration information to the HSLC 12 in the information field. The configuration information includes buffer and memory size.

Figure 4:
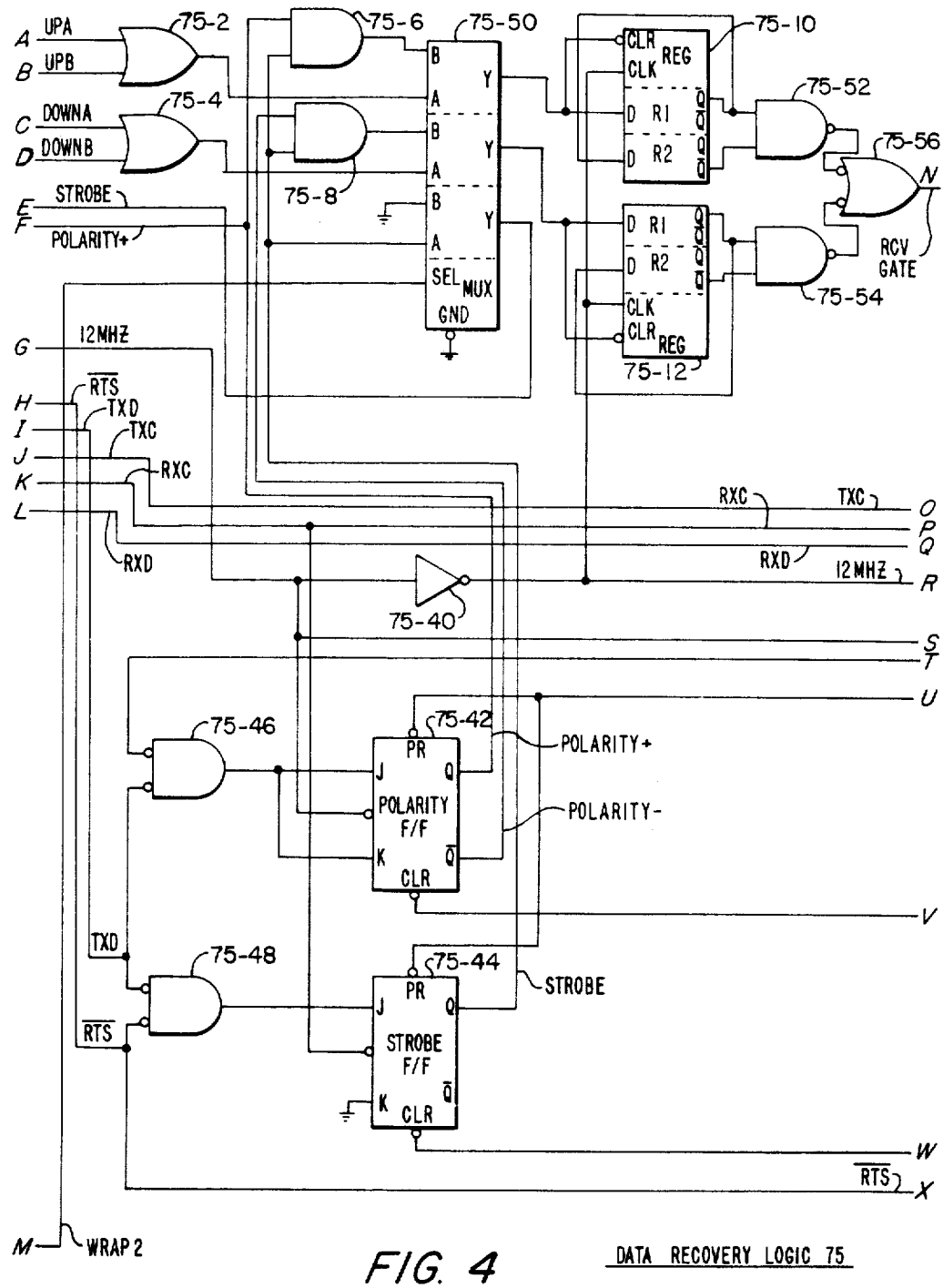
FIG. 4 is a logic diagram of the data recovery logic of the HSLC.

FIG. 4 shows the data recovery logic 75 of HSLC 12. Data recovery logic 75 receives data bits from work stations 16-17 through 16-32 via analog circuits 76 as signals UPA and DWNA and from work stations 16-33 through 16-48 via analog circuits 78 as signals UPB and DWNB and generates a receive clock signal RXC and a receive data signal RXD. The communications controller 72 uses the rising edge of the RXC signal to sample the RXD signal to indicate the receiving of a data pulse by data recovery logic 75 from analog circuits 76 or 78. The communications controller 72 assembles the data bits into bytes for transfer onto data bus 35, FIG. 2, of signals D0 through D7.

The data recovery logic 75 transmits the POLARITY and STROBE signals to analog circuits 76 and 78 for transfer to an addresed work station 16-17 through 16-48. The data recovery logic 75 generates a transmit clock signal TXC. The communications controller 72 is responsive to signal TXC to generate a request to send signal $\overline{\text{RTS}}$ and a transmit data signal TXD. The TXC signal controls the rate at which data bits represented by the TXD signal are shifted out of the communications controller 72 to the data recovery logic 75 for generating the POLARITY and STROBE signals.

During the receive mode of operation, the data bits are received as signals UPA and DWNA or UPB and DWNB. Data recovery logic 75 adjusts its bit clocking system to synchronize with the stream of bits represented by signals UPA and DWNA or UPB and DWNB. A counter 75-16 generates repeating binary count signals from output terminals QA, QB, QC and QD representing decimal 0 through decimal 15. During the steady state operation, binary count signals from counter 75-16 receive the UPA and DWNA or UPB and DWNB signals during "8 time" and the data signal RXD is clocked into the communications controller 72 by the clock signal RXD at the start of "0 time". Initially, the UPA and DWNA or UPB and DWNB signals may be received at any time and the binary count signals are adjusted by incrementing the binary count signals by one if the first UPA and DWNA or UPB and DWNB signals are received from "0 time" to "7 time" and decrementing the binary count signals by one if the UPA and DWNA or UPB and DWNB signals are received during "9 time" through "15 time". The net effect is to adjust the system to nominally clock the data in at "8 time".

Data bits sent from transmitting work stations 16-17 through 16-32 via analog circuits 76 are applied to OR gates 75-2 and 75-4 as signals UPA and DWNA respectively. Data bits sent from transmitting work stations 16-33 through 16-48 via analog circuits 78 are applied to OR gates 75-2 and 75-4 as signals UPB and DWNB respectively. Signal UPA at logical ONE indicates an information bit received by analog circuits 76 from one of the work stations 16-17 through 16-32 had a rising leading edge. Signal DWNA at logical ONE indicates that the information bit received by analog circuits 76 had a falling leading edge. Signals UPB and DWNB operate in a similar manner with analog circuit 78 and work stations 16-33 through 16-48.

A multiplexer 77-50 selects the output of OR gates 75-2 and 75-4 for storage in registers R1 75-10 and 75-12 respectively on the rise of the 12 MHz clock output of inverter 75-40. Assuming either signal UPA or DWNA goes to logical ONE, then at the rise of the 12 MHz clock signal from inverter 75-40, the Q output of either register R1 75-10 or register R1 75-12 is forced to logical ONE. The Q outputs of register R2 75-10 and register R2 75-12 remain at logical ONE. Therefore, the output of a NAND gate 75-52 or a NAND gate 75-54 goes to logical ZERO forcing the output signal RCVGATE of a negative OR gate 75-56 to logical ONE. The RCVGATE signal remains at logical ONE until the rise of the next 12 MHz clock pulse output from inverter 75-40. If register R1 75-10 stores signal UPA at logical ONE, then register R2 75-10 is set forcing the Q output signal to logical ZERO. If register R1 75-12 stores signal DWNA at logical ONE, then register R2 75-12 is set forcing the Q output signal to logical ZERO. In either case, the RCVGATE signal output of negative OR gate 75-56 is forced to logical ZERO indicating a data bit, basically synchronizing the data to the clock.

The counter 75-16 counts the 12 MHz clock signals from an inverter 75-40 as long as the enable P (ENP), enable T (ENT), clear (CLR) and LOAD input terminals are at logical ONE. A comparator 75-18 receives the binary count signals from counter 75-16 at input terminals A0, A1, A2 and A3 which are compared with the decimal 8 (binary 0001) applied to the B0, B1, B2 and B3 input terminals.

When the binary count from counter 75-16 equals decimal 8, the A equals B signal from terminal A=B OUT is applied to a NAND gate 75-36 via an inverter 75-38. This forces the counter load signal CTRLD to logical ONE suppressing the load operation.

When the binary count from counter 75-16 is equal to decimal 0 through decimal 7, then the A is less than B signal from A<B OUT terminal of comparator 75-18 is applied to an A2 input terminal of an adder 75-14 thereby incrementing the binary count applied to input terminals B1, B2, B3 and B4 of adder 75-14 by decimal 2.

When the binary count from counter 75-16 is equal to decimal 9 through decimal 15, then neither the A equals B nor the A is less than B signal from comparator 75-18 is generated.

The output signals from terminals S1, S2, S3 and S4 represent a binary count which is the input binary count applied to terminals B1, B2, B3 and B4 from counter 75-16 incremented by decimal 2 when the binary count from terminals QA, QB, QC and QD is from decimal 0 through decimal 7. The output binary count from terminals S1, S2, S3 and S4 of adder 75-14 equals the input binary count to terminals B1, B2, B3 and B4 of adder 75-14 when the binary count from terminals QA, QB, QC and QD is from decimal 8 through decimal 15.

The $\overline{RTS}$ signal applied to NAND gate 75-36 remains at logical ONE for the receive operation. The A equals B signal is at logical ONE at the input terminal of NAND gate 75-36 when the binary count from counter 75-16 is from decimal 0 through decimal 7 and decimal 9 through decimal 15. Therefore, whenever the data bit signal RCVGATE is applied to the input terminal of NAND gate 75-36 and the binary count output of counter 75-16 is from decimal 0 through decimal 7, then signal CTRLD is forced to logical ZERO initiating the load operation of counter 75-16 on the next rise of the 12 MHz clock signal from inverter 75-40. This results in the binary count from decimal 2 through decimal 9 being loaded into counter 75-16. If the binary count stored in counter 75-16 was a decimal 6, then decimal 8 would be loaded into counter 75-16.

When the data bit signal RCVGATE is applied to the NAND gate 75-36 and the binary count output of a counter 75-16 is from decimal 9 through decimal 15, then the load operation is again initiated by signal CTRLD. In this case, the output binary count from adder 75-14 which equals the input binary count to adder 75-14 is loaded into counter 75-16. This repeats the binary count output of counter 75-16 for two cycles of the 12 MHz clock from inverter 75-40.

When the data bit signal RCVGATE is applied to the NAND gate 75-36 when the binary count output from counter 75-16 is decimal 8, then the A equals B signal from comparator 75-18 suppresses the load operation and the binary count in counter 75-16 proceeds normally. Note that the counter 75-16 will be adjusted to receive RCVGATE signals with a binary count of decimal 8 within eight or fewer successive RCVGATE signals.

The data bit signal RCVGATE is applied to the K terminal of a flop 75-34 and to an AND gate 75-58 via an inverter 75-32. The QC output signal of counter 75-16 at logical ZERO enables a decoder multiplexer (MUX) 75-21. The QA and QB output signals of counter 75-16 are applied to the A and B input terminals of MUX 75-21. The QD output signal from counter 75-16 and a terminal Y1 output signal from MUX 75-21 are applied to the inputs of a NAND gate 75-26. The Y1 output signal from MUX 75-21 is at logical ZERO when the QB and QC output signals from counter 75-16 are at logical ZERO and the QA output signal is at logical ONE indicating a decimal 1 or decimal 9 count from counter 75-16. The QD output signal at logical ZERO applied to NAND gate 75-26 generates an ST1 signal at logical ONE indicating a decimal 1 output from counter 75-16. If the RCVGATE signal is applied to the K input terminal of a flop 75-34 and to an AND gate 75-48 via an inverter 75-32 when the output count of counter 75-16 is decimal 1, then the J input terminal is a logical ONE and the flop 75-34 sets on the fall of the 12 MHz clock signal forcing the receive data signal RXD to logical ONE.

If signal RCVGATE is a logical ONE indicating a receive data bit with flop 75-34 set, then terminal K is at logical ONE and terminal J is at logical ZERO causing flop 75-34 to reset which forces the RXD signal to logical ZERO. Note that the RXD signal, once forced to logical ONE, remains at logical ONE during the normal receive mode until a RCVGATE signal at logical ONE is generated indicating a data bit.

The QD output signal from counter 75-16 is inverted by an inverter 75-30 which generates the RXC signal. The communications controller 72 receives the RXC and RXD signals. The rising edge of the RXC signal clocks the data signal RXD in the communications controller 72 for sampling "0" data bits and "1" data bits.

Figure 3B:
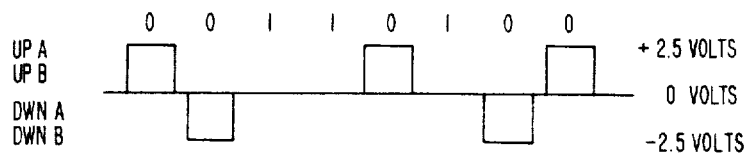
FIG. 3B shows the waveshape of the signals transferred between the HSLC and the work stations.

As shown in FIG. 3B, the analog circuits 76 and 78 generate UPA, UPB, DWNA and DWNB signals at logical ONE to generate "0" data bits. Signals UPA, UPB, DWNA and DWNB remain at logical ZERO for "1" data bits. This system of coding is called bipolar modulation and insures that there is no direct current component in the pulse train. The forcing of a "0" bit after 5 successive "1" bits assures a transition and allows the receivers to resynchronize their clocks.

The communications controller 72 uses the rise of the RXC clock signal to sample the state of the RXD signal. The RXD signal at logical ZERO indicates a "0" bit and the RXD signal at logical ONE indicates a "1" bit.

Figure 3C:
FIG. 3C shows the waveshape of the signals of FIG. 3B received by the HSLC and converted into the RCVGATE signal.

FIG. 3C shows the RCVGATE signals generated in the data recovery logic 75 upon receiving the UPA, UPB, DWNA and DWNB signals from analog circuits 76 and 78.

During the transmit mode of operation, the communications controller 72 synchronizes the data stream with the data recovery logic 75 by receiving the transmit clock TXC signal which is generated by the QD output timing signal from counter 75-16.

The communications controller 72 generates a request to send the $\overline{RTS}$ signal at logical ZERO which is applied to a negative AND gate 75-48 as well as NAND gate 75-36 as long as the communications controller has data to transmit. The $\overline{RTS}$ signal at logical ZERO applied to NAND gate 75-36 disables the counter 75-16 load operation, making it a free running counter.

The transmit data bit signal TXD at logical ZERO is applied to the input of negative AND gate 75-46 and negative AND gate 75-48. The output of negative AND gate 75-48 is applied to the J terminal of a strobe flop 75-44. Since the K terminal is at logical ZERO, strobe flop 75-44 sets on the fall of the RXC signal following the clock cycle in which the clear signal CL is forced to logical ZERO, and the STROBE output signal at logical ONE is applied to analog circuits 76 and 78 via MUX 75-50. The Y3 terminal of decoder MUX 75-20 generates a state 3 and a state C signal when the binary count signal is at logical ZERO and the binary count signals QA and QB are at logical ONE. The Y3 terminal signal is applied to a NAND gate 75-24.

The binary count signal QD at logical ZERO is applied to another input of NAND gate 75-24. The state 3 output signal and the 12 MHz clock signal are applied to respective inputs of a NAND gate 75-28. The output clear signal at logical ZERO assures that the flop 75-44 is reset at "3" time of counter 75-16.

A decoder MUX 75-20 is enabled by the binary count QA signal from counter 75-16 at logical ZERO. Binary count signals QB and QC at logical ONE, applied to decoder MUX 75-20 terminals A and B respectively, generate a counter 75-18 state 6 and E signals from output terminal Y3 which is appled to an input of a negative NAND gate 75-22. The binary count QD signal at logical ZERO is applied to the other input of negative NAND gate 75-22. The output ST6 signal at logical ZERO is applied to the other input of NAND gate 75-46 causing a polarity flop 75-42 to toggle on the fall of the 12 MHz clock signal, since both the J and K inputs are at logical ONE. Flop 75-42 is a 74S112 logic element which toggles, that is if set, it resets; or if reset, it sets on the fall of the 12 MHz clock signal with both the J and K terminals at logical ONE. The POLARITY signal indicates to the analog circuits 76 and 78 to reverse the polarity of this data bit received over the STROBE signal line from the previous data bit received over the STROBE signal line. Note that only "0" bits are toggled; "1" bits have no effect on the flop 75-42.

FIG. 5 shows a timing diagram of the receive mode of operation wherein the data is received "on time" at "8 time", "early" at "4 time" and "late" at "9 time".

FIG. 5A shows a bit sequence, binary 0100, received from analog circuits 76 or 78. Analog circuits 76 generates signals UPA and DWNA, and analog circuits 78 generates signals UPB and DWNB. Assuming the data stream is generated by analog circuits 76, then the UPA signal A generates the RCVGATE signal A to indicate the first binary ZERO. The DWNA signal B generates RCVGATE signal B to indicate the second binary ZERO, and the UPA signal C generates RCVGATE signal C to indicate the third binary ZERO. Note that there is no transition in the cycle between the first and second binary ZERO's indicating a binary ONE.

In FIG. 5, the data on time mode shows RCVGATE signals A, B and C during the first, second and fourth cycles. There are 16 time slots per cycle, each time slot having a duration of 83 nanoseconds. Each cycle has a duration of 1.3 microseconds, starts at the beginning of time slot O and ends at the end of time slot F. Data bits, therefore, are received at the rate of 750,000 bits per second. The receive clock RXC signal which rises at the start of the 0 time slot and falls at the start of the 8 time slot is applied to the communications controller 72 for synchronization with the data recovery logic 75. The RCVGATE signal generates the receive data signal RXD which falls at the start of the 9 time slot and rises at the start of the next 2 time slots and which is applied to the communications controller 72 which uses the rising edge of the RXC signal to sample the RXD data signal. Note that the RCVGATE signals A, B and C are received at "8 time".

When the data is received early, the data recovery logic 75 advances the time slot in which each successive data binary ZERO bit is received until the data bits are received at "8 time". The RCVGATE signal A is received during the 4 time slot. Since this is received early, the counter 75-16 is incremented by two and the 6 time slot follows the 4 time slot. The RCVGATE signal B is received during the 5 time slot. Since this is still early, the counter 75-16 is again incremented by two to stop the 6 time slot. The RCVGATE signal C is received during the 6 time slot and the counter 75-16 again is incremented by two. The fourth RCVGATE signal (not shown) would be received during the 7 time slot and the fifth RCVGATE signal (not shown) would be received during the 8 time slot putting the data recovery logic 75 in synchronization with the analog circuits 76 and 78.

The receive clock RXC signal as described supra falls at the beginning of the 8 time slot and rises at the beginning of the 0 time slot. The receive data RXD signal falls at the fall of the RCVGATE signal and rises at the start of the following 2 time slot.

When the RCVGATE signal is received late, the counter 75-16 is loaded with its output count by adder 75-14. RCVGATE signal A is received during the A time slot. Note that the next time slot is also an A time slot. RCVGATE signal B is received 16 time slots later during time slot 9. Time slot 9 repeats and RCVGATE signal C is received 16 time slots later at time slot 8 synchronizing data recovery logic 75 to the data bit stream from analog circuits 76. The receive clock RXC signal and the receive data signals are timed as described supra.

FIG. 6 is a timing diagram of the transmit data operation.

The request to send $\overline{RTS}$ signal is forced low by the communications controller 72 indicating that the communications controller is ready to transmit data bits to the data recovery logic. The transmit clock TXC signal from the data recovery logic synchronizes the communications controller 72 to the timing of the data recovery logic 75. The data recovery logic 75 receives the data bit TXD signal which goes low at the start of the 2 time slot and rises at the start of the following B time slot for each binary ZERO bit. The data bit TXD signal stays high for each binary ONE bit. The data bit TXD signal stays high during successive cycles in which the data received is a string of binary ONE bits.

The STROBE signal indicating binary ZERO bits A and C when low and a binary ONE bit B when high is applied to the analog circuits 76 and 78 along with the POLARITY signal which indicates whether the binary ZERO bit pulse is a positive voltage pulse or a negative voltage pulse as shown in FIG. 6A.

The POLARITY pulse, therefore, alternates on binary ZERO pulses, being high for binary ZERO pulse A, low for binary ZERO pulse C, high for binary ZERO pulse D, and so on. There is no change on the POLARITY signal for binary ONE pulses. Note that the POLARITY signal is high for both binary ZERO pulse A and binary ONE pulse B.

The receive and transmit logic is tested within the data recovery logic 75 during a WRAP mode of operation in which the communications controller 72 generates a test pattern of transmit data bit TXD signals which are translated into STROBE and POLARITY signals. The STROBE and POLARITY signals are applied to the B terminals of MUX 75-50 for storage in registers 75-10 and 75-12. The RCVGATE signal is generated and synchronizes the binary count of counter 75-16 to the data bit stream and also generates the receive data bit RXD output signal from flop 75-34 as described supra.

Microprocessor 30 generates status signals $\overline{S0}$, $\overline{S1}$ and $\overline{S2}$ which are applied to the bus controller 38 which generates the $\overline{IOWC}$ signal. Microprocessor 30 also generates address signals A4, A5, A6 and A7 at logical ZERO. A decoder 75-70 is enabled by address signal A7 at logical ZERO and decodes address signals A4, A5 and A6 at logical ZERO to generate signal WRAP 1 from output terminal 0. The microprocessor 30 generates data signal D4 at logical ONE which is applied to the D input of a flop 75-74. Signals $\overline{IOWC}$ and WRAP 1 at logical ZERO applied to a negative AND gate 75-72 generate a clock signal to set flop 75-74. The output signal WRAP 2 is applied to a select terminal of MUX 75-50 thereby selecting the B input terminals. Signal $\overline{RTS}$ at logical ZERO conditions the transmit logic in data recovery logic 75 to be responsive to the transmit data bit TXD signal to set flops 75-42 and 75-44 for generating the STROBE and POLARITY signals. The UPA and UPB signals are simulated by the POLARITY+ signal from flop 75-42 and the STROBE signal from flop 75-44 being applied to an AND gate 75-6. The DWNA and DWNB signals are simulated by the POLARITY− and STROBE signals applied to an AND gate 75-8. The output of AND gate 75-6 or 75-8 is stored in flop 75-10 or 75-12 which generates the RCVGATE signal via NAND gate 75-52 or 75-54 and negative OR gate 75-56. The operation continues as in the receive mode as described supra.

Figure 7:
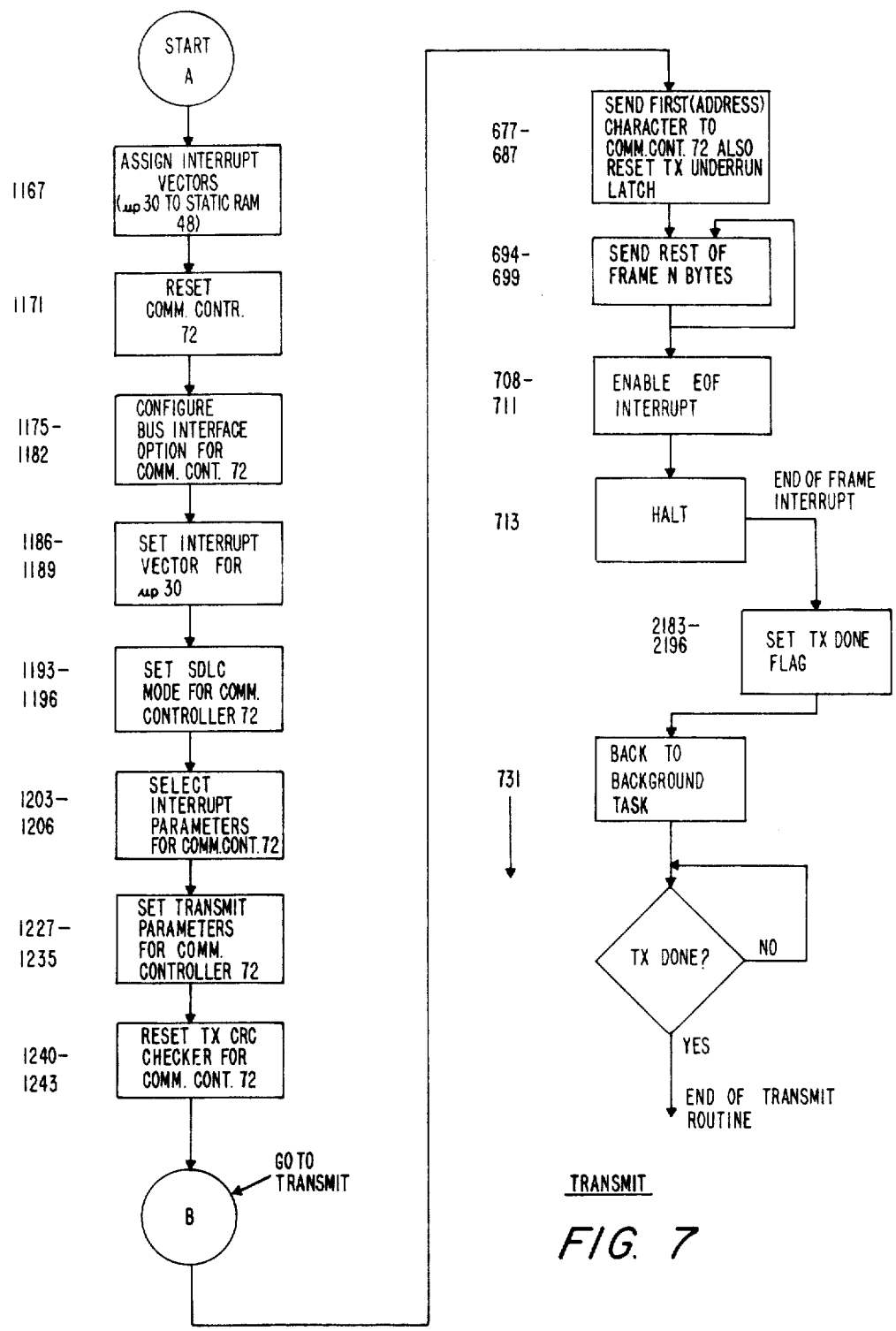
FIG. 7 is a flow diagram of the transmit operation.

Referring to FIG. 7, the firmware routines that control the HSLC 12 operation are stored in PROM 46, FIG. 2. Static RAM 48 provides firmware workspace during the execution of firmware programs by microprocessor 30. The communications controller 72 operates in a half duplex mode, that is it either transmits a full frame of information to the work stations 16-17 through 16-48, FIG. 1, by processing a transmit initialization firmware routine, or receives a full frame of information from the work stations 16-17 through 16-48 by processing a receive initialization routine, FIG. 8. Both the transmit and receive initialization routines load assigned address locations in static RAM 48 with interrupt vectors. These interrupt vectors serve as starting address locations of firmware routines which enable microprocessor 30 to process the interrupts. During the transmit mode, the assigned address locations are loaded with interrupt vectors to processor transmit interrupts and during the receive mode the assigned address locations are loaded with interrupt vectors to process receive interrupts.

The communications controller 72, FIG. 4, includes logic for two identical controller channels, channel A and channel B, each consisting of a transmitter section and a receiver section. Each control channel also includes 8 control and 2 status registers 72-2A and 72-2B which are loaded by the transmit or receive initialization firmware routines with information for controlling the respective transmit or receive operation. In addition, a third status register S2B is associated with control channel B. The functions of the control registers are described in the μPD7201 Technical Manual referenced supra.

Control registers 0A and 0B store frequently used commands and register pointer control information.

Control registers C1A and C1B store interrupt control information.

Control registers C2A and C2B store microprocessor 30/bus controller 38 control information.

Control registers C3A and C3B store receiver control information.

Control registers C4A and C4B store mode control information.

Control registers C5A and C5B store transmitter control information.

Control registers C6A and C6B store sync/address character information.

Control registers C7A and C7B store sync character information.

Status registers S0A and S0B store buffer and external status information including buffer overflow information.

Status registers S1A and S1B store received character error and special condition status information.

Status register S2B stores interrupt vector information.

The transmit initialization routine is started in block 1167 by the microprocessor 30 assigning the interrupt vectors in address locations in static RAM 48. These interrupt vectors are used as starting address locations of firmware routines for microprocessor 30 to process communications controller 72 various receive operation and transmit operation interrupts. The communications controller 72 generates an INTERRUPT signal via an inverter 72-2 which is applied to microprocessor 30 which sends back an interrupt acknowledge signal INTERRUPT ACK via bus controller 38.

Block 1171 resets the communications controller 72 by branching to a reset firmware routine which results in the microprocessor 30 sending a control word to control register 0 of channels A and B via data register 42 signals D0 through D7 which contains a channel reset command. Address signal A8 applied to communications controller 72 selects channel A or channel B and address signal A7 defines the D0 through D7 signals as a data byte or a command byte.

Block 1175–1182 configures the interface between bus controller 38 and communications controller 72 by loading control register 2 channel A of communications controller 72 to indicate if channel A or B is used in a direct memory access (DMA mode) or in a non-DMA mode where transfers are performed by CPU 4 in either polled, interrupt or block transfer modes. Also, the relative priorities of the various interrupt and DMA conditions are defined as well as how the communications controller 72 responds to an interrupt acknowledge sequence from microprocessor 30.

Block 1186–1189 loads control register 2 of channel B of communications controller 72 with the interrupt vector to which microprocessor 30 will respond if no higher interrupt vector level is received by microprocessor 30.

Block 1193–1196 loads control register 4 of channel A with information putting communications controller 72 in a synchronous mode (SDLC) wherein the clock is set at the data bit rate and no parity bit is transferred.

Block 1203–1206 loads control register 1 of channels A and B with information to indicate to the communications controller 72 under which conditions to issue an interrupt. As an example, an interrupt occurs on transmit buffer empty. This would result in an interrupt for every byte.

Block 1227–1235 loads register 5 of channel A with information defining the transmit parameters such as which cyclic redundancy check (CRC) formulae to use and defining the number of bits per character.

Block 1240–1243 loads register 0 of channel A with information to reset the transmit CRC checking logic.

The transmit frame operation starts in block 677–877 wherein the address of the first character of the frame is loaded into an AL register of microprocessor 30. The first byte is read from dynamic RAM 52 at the address specified by the contents of register AL and stored in the BL register of microprocessor 30 for transfer to the communications controller 72.

Block 694–699 transfers the remaining byte of the frame from dynamic RAM 52 to communications controller 72.

Block 708–711 generates an external status change interrupt signifying the frame is sent to the work stations by the communications controller 72 and the CRC bytes generated by the communications controller 72 are sent.

Block 713 halts the transmission with the transmit buffer empty interrupt enabled which results in a branch to process the end of the frame interrupt.

Block 2183–2196 sets the transmit done flag and returns to the background task.

Block 731 returns to the background task and tests for the successful transmission of the frame including the CRC bytes. The transmit done flag at binary ONE indicates that the transmit operation is complete.

Figure 8:
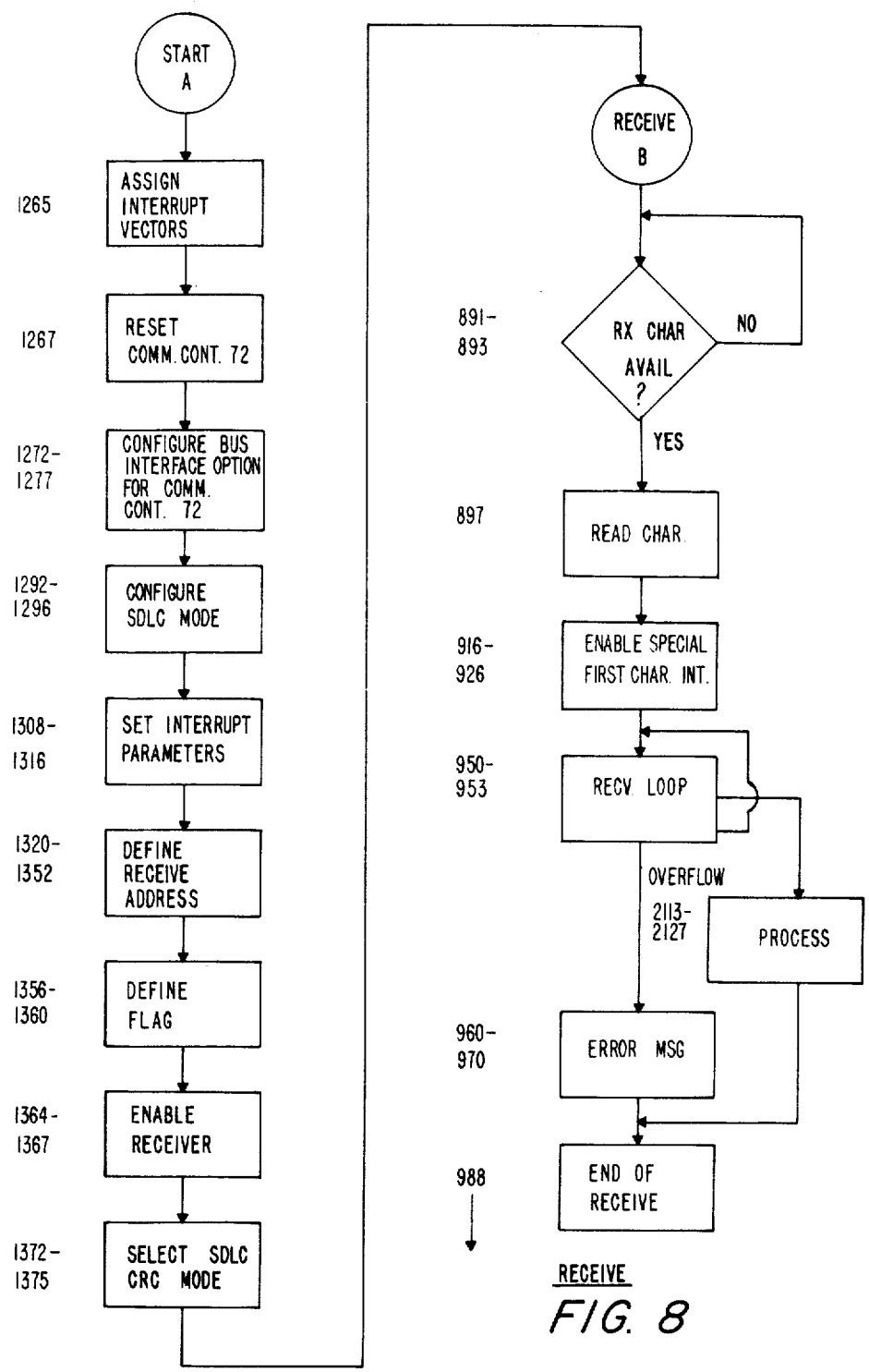
FIG. 8 is a flow diagram of the receive operation of the HSLC.

The receive initialization firmware routine starts in block 1265, FIG. 8, by storing the interrupt vectors in the address locations of static RAM 48 thereby replacing the interrupt vectors stored during a previous information frame transfer.

Block 1267 resets the communications controller 72 by branching to the reset firmware routine as described supra in block 1171.

Block 1272–1277 configures the interface between bus controller 38 and communications controller 72 by loading control register 2 channel A and channel B of communications controller 72 as in block 1175–1182 described supra. In addition, the watchdog timer on channel B is initialized. The watchdog timer is set to initiate an interrupt if this receive operation being processed is not completed within a predetermined time. The microprocessor 30 is responsive to the interrupt to terminate this receive operation.

Block 1292–1296 configures the communications controller 72 by loading control register 4 channel A with information putting the communications controller 72 in an SDLC mode wherein the clock is set at the data bit rate and no parity bit is received.

Block 1308–1316 sets the interrupt parameters by loading control register 1 of channels A and B. These parameters define the conditions under which the communications controller 72 will issue an interrupt.

Block 1320–1352 defines the receive address character by loading control register 6 channel A with the address location of dynamic RAM 52 into which the first receive byte is stored.

Block 1356–1360 loads control register 7 channel A with the start of frame character (01111110). The communications controller 72 compares all information received with the start of frame character stored in control register 7 channel A.

Block 1364–1367 loads control register 3 channel A with information to start the receive operation. The contents of control register 3 channel A defines the character as an 8-bit byte, enables the CRC logic and places the communications controller 72 into the address search mode for transferring the address location stored in control register 7 channel A to dynamic RAM 52 for loading the first device address byte received by the communications controller 72.

Block 1372–1375 loads control register 5 channel A with information to select the CRC polynominal used by the communications controller 72 for checking the frame received.

Block 891–893 loops on status register 0 channel A for an indication of a byte received by the communications controller 72. When the byte is received, then block 897 stores the byte in the address location of dynamic RAM 52 specified by the contents of control register 7 channel A.

Block 916-926 interrupts the microprocessor 30 to indicate that the first byte has been received thereby preventing the microprocessor 30 from interrupting the communications controller 72 during the time required to receive the remainder of the frame.

Block 950-953 loops to receive the remaining bytes of the frame until the end of frame character is received. The end of SDLC frame bit in status register 2 channel A indicates that the end of frame character has been received and that the CRC is valid. This results in a branch to block 2113-2127.

Block 2113-2127 reads status register 0 channel A in order to capture current status and resets the external status interrupt and increments a flag indicating that an abort sequence (8 or more 1's) has occurred or a synchronization change has occurred.

Block 960-970 is entered if block 950-953 indicates an overflow condition, that is more than one frame of information processed, and branches to an abort firmware routine.

Block 988 processes any abort error and returns to the background firmware routine to await the next receive or transmit request.

Figure 9:
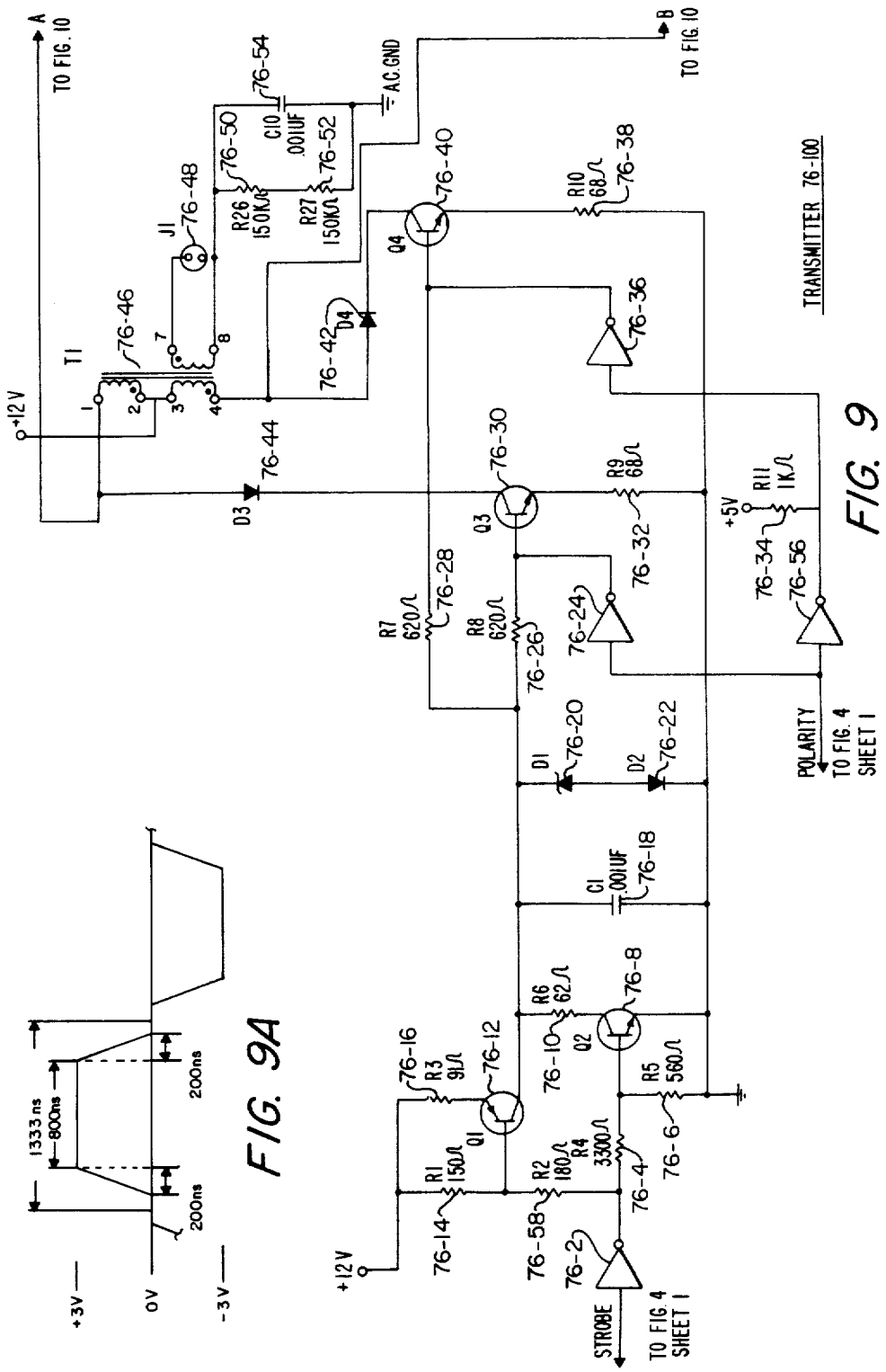
FIG. 9 is a circuit diagram of the analog circuits transmitter.
Figure 10:
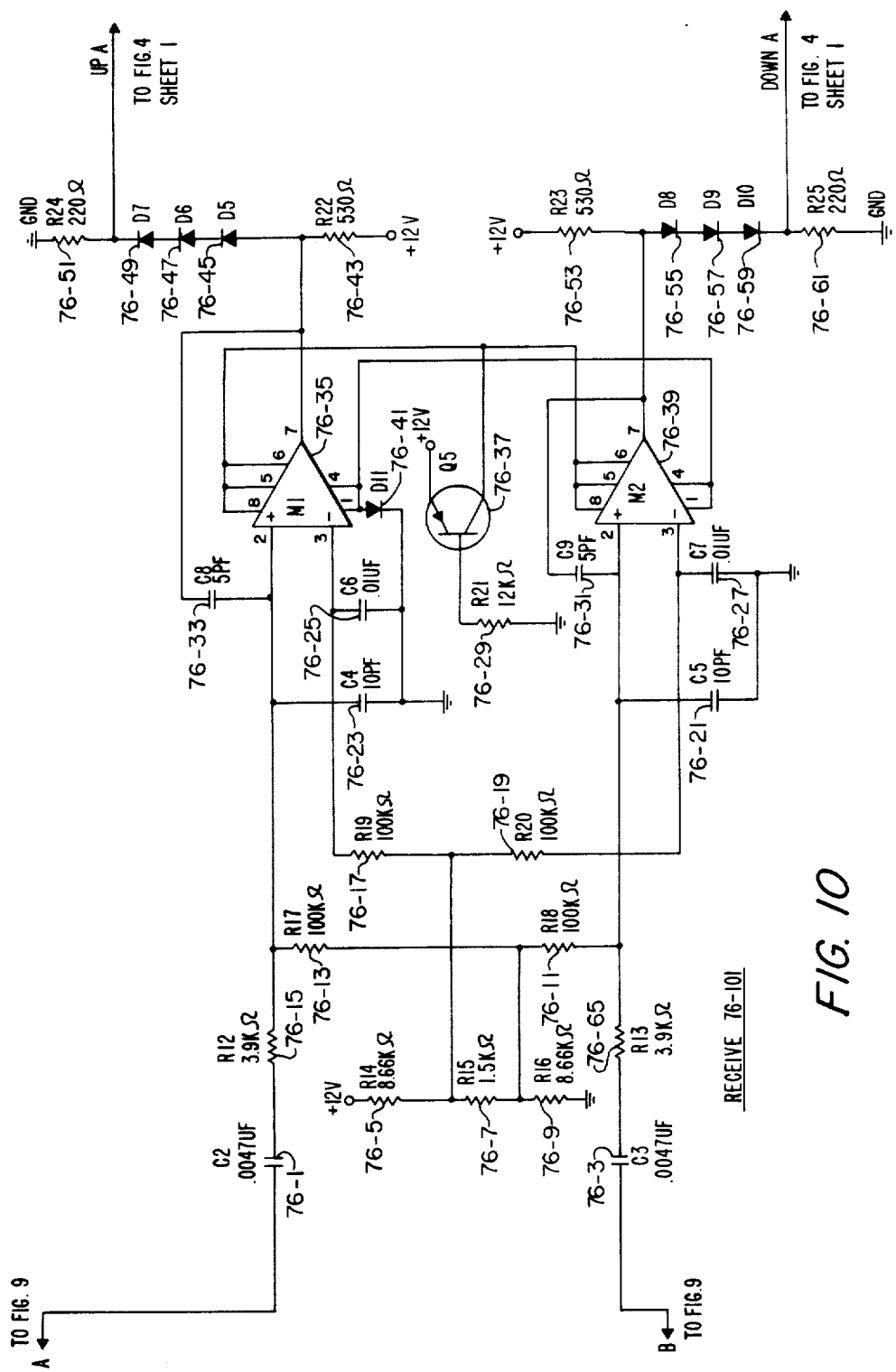
FIG. 10 is a circuit diagram of the analog circuits receiver.

The analog circuits 76 is made up of a transmitter 76-100, FIG. 9, and a receiver 76-101, FIG. 10. Referring to FIG. 9, the analog circuits 76 receives the POLARITY and STROBE signals representative of the data being transferred from the HSLC 12 to the work stations 16-17 through 16-32, FIG. 1, via coaxial bus 12-1 and strobes them in order to reduce the reflections on the coaxial bus 12-1. The reflections would tend to reduce the amplitudes of the signals and also cause spurious signals thereby reducing the reliability of the system.

The STROBE signal is received from data recovery logic 75 by the transmitter 76-100 and turns a transistor (Q1) 76-12 on via an inverter 76-2 and the divider network of resistors R1 76-14 and R2 76-58; normally the base of Q1 76-12 is high via the divider network of resistors R5 76-6, R4 76-4, R2 76-58 and R1 76-14 to +12 volts. The STROBE signal when high is inverted by inverter 76-2 and drives the base of Q1 76-12 low, turning on the transistor.

Transistor Q1 76-12 is a constant current source which charges up a capacitor (C1) 76-18 to 6.2 volts. The output of C1 76-18 is clamped to 6.2 volts by a zener diode D1 76-20 and a diode D2 76-22 to ground.

When the STROBE signal goes low, transistor Q1 76-12 turns off and a transistor Q2 76-8 turns on, discharging C1 through a resistor R6 76-10 and transistor Q2 76-8. The result is that the STROBE signal appears as a trapezoidal-shaped signal at the base of transistors Q3 76-30 and Q4 76-40. The trapezoidal-shaped signal has approximately a 200 nanosecond rise time and a 200 nanosecond fall time. The zener diode D1 76-20 keeps the amplitude precisely at 6.2 volts. Note that when the STROBE signal goes low, the output of inverter 76-2 is high and current is fed into the base of Q2 76-8 through R1 76-14 and R2 76-58 and R4 76-4. Resistor R5 76-6 stabilizes the current through Q2 76-8 by shunting the base.

The output signals from Q3 76-30 and Q4 76-40 are applied to the opposite terminals of the primary winding of a center-tapped transformer 76-46. The POLARITY signal from data recovery logic 75 is applied to the base of Q3 76-30 through an inverter 76-24 and to the base of Q4 76-40 through inverters 76-56 and 76-36.

When the POLARITY signal is high, the output of inverter 76-24 shorts the base of Q3 76-30 to ground, turning Q3 76-30 off. When the POLARITY signal is high, the base of Q4 76-40 has a high impedance. This allows the signal through resistor R7 76-28 to be applied to the base of Q4 76-40. If this signal is the positive-going triangular-shaped waveform, that is it follows the voltage across C1 76-18, then the Q4 76-40 translates the voltage waveform into a current waveform which then flows from pin 4 to pin 3 of transformer 76-46. This signal is inverted across pins 7 and 8 of the secondary winding of transformer 76-46.

When the POLARITY signal is low, the base of Q3 76-30 is high and the voltage across C1 76-18 is translated through resistor R8 76-26 and transistor Q3 76-30 into a current waveform which is applied from pin 1 to pin 2 of the primary winding of transformer 76-46 and across pins 7 and 8 of the secondary winding not inverted. The output signal from transformer 76-46 is applied to coaxial connector 76-48 for transfer down coaxial buses 12-1 and 12-2, FIG. 1, to the work stations 16-17 through 16-48. Diodes D3 76-44 and D4 76-42 prevent transistors Q3 76-30 and Q4 76-40 from conducting on negative-going signals applied to the collector when the power supply is off.

Resistors R26 76-50 and R27 76-52 in parallel with capacitor C10 76-54 provide for an RF signal ground for the coaxial connector 76-48 outer shield and at the same time isolate the DC and power supply frequencies from ground to prevent shock hazard; that is, 60 cycle power applied to the shield of the coaxial connector 76-48 will have 300K ohms to ground and any RF signal will be shunted to ground by the 0.001 microfarad capacitor 76-54 thereby preventing electrical interference.

Resistors R9 76-32 and R10 76-38 translate the voltage applied to the base of Q3 76-30 and Q4 76-40 to current levels. Resistor R11 76-34 is a pull-up resistor for the output of inverter 76-58 which is an open collector device.

The timing diagram of FIG. 9A shows the signal on the coaxial buses 12-1 and 12-2 when the STROBE signal generates a positive-going pulse and the POLARITY signal is high or low. The ramp rise and fall times are 200 nanoseconds each, the dwell time is 800 nanoseconds, and the bit cell time is 1333 nanoseconds (750,000 bits per second).

The receiver 76-101 receives signals from work stations 16-17 through 16-48 of FIG. 1, coaxial bus 12-1, coaxial connector 76-48, secondary winding pins 7 and 8 of transformer 76-46, primary winding pins 1 and 2, and primary winding pins 3 and 4.

Referring to FIG. 10, the signal from pin 1 of transformer 76-46 is applied to terminal 2 of a comparator 76-35 through a capacitor C2 76-1 and a resistor R12 76-15. The signal from pin 4 of transformer 76-46 is applied to pin 2 of a comparator 76-39 through a capacitor C3 76-3 and a resistor R13 76-65. Comparators 76-35 and 76-39 are LM311 circuits described in the "Linear Data Book" published in 1980 by the National Semiconductor Corporation, 2900 Semiconductor Drive, Santa Clara, Calif. 95051.

A threshold voltage is applied to pin 3 of comparators 76-35 and 76-39 through the divider network between 12 volts and ground of resistors R14 76-5, R15 76-7 and R16 76-9 and resistors R17 76-13 and R19 76-19.

When the signal applied to pin 2 of comparator 76-35 is greater than the threshold voltage on pin 3, then an output signal appears on pin 7. The output signal is adjusted to a logic level by the divider network from +12 volts, and resistor R22 76-43, diodes D5 76-45, D6 76-47, D7 76-49, and resistor R24 76-51 to ground. The output signal UPA is applied to OR gate 75-2, FIG. 4.

Similarly, when the signal applied to pin 2 of comparator 76-39 is greater than the threshold voltage applied to pin 2, then an output signal appears on pin 7. The output signal is adjusted to a logic level by the divider network from +12 volts, and resistor R23 76-53, diodes D8 76-55, D9 76-57, D10 76-59 and resistor R25 76-61 to ground. The output signal DOWNA is applied to OR gate 75-4 of FIG. 4.

In addition when power is on, transistor Q5 76-37 is turned on and supplies the +12 volts to pins 5, 6 and 8 of comparators 76-35 and 76-39. The internal circuits go to ground through pins 1 and 4 and diode D11 76-41. When power is off, transistor Q5 76-37 is turned off and acts as a diode which with diode D11 76-41 blocks any signal applied to pin 2 of comparators 76-35 and 76-39 from ground, thereby preventing the clamping of any signal over the coaxial bus 12-1.

Capacitors C2 76-1 and C3 76-3 block DC voltages from the transmitter. Resistors R12 76-15 and R13 76-65 in conjunction with capacitors C4 76-23 and C5 76-21 eliminate extraneous noise. Resistors R17 76-13 and R18 76-11 create the proper bias levels on input terminal 2 of comparators 76-35 and 76-39. Resistors R19 76-17 and R20 76-19 limit the voltage offset of the comparators 76-35 and 76-39. In addition, capacitors C6 76-25 and C7 76-27 are AC bypass capacitors which in conjunction with resistors R19 76-17 and R20 76-19 keep the threshold voltage stable.

Capacitors C8 76-33 and C9 76-31 are speed-up capacitors which provide positive feedback to insure fast switching and prevent oscillations of comparators 76-35 and 76-39. Each of the work stations 16-17 through 16-48 includes similar analog circuits for generating trapezoidal data signals for transfer over the coaxial buses 12-1 and 12-2 to the HSLC 12.

Figure 11:
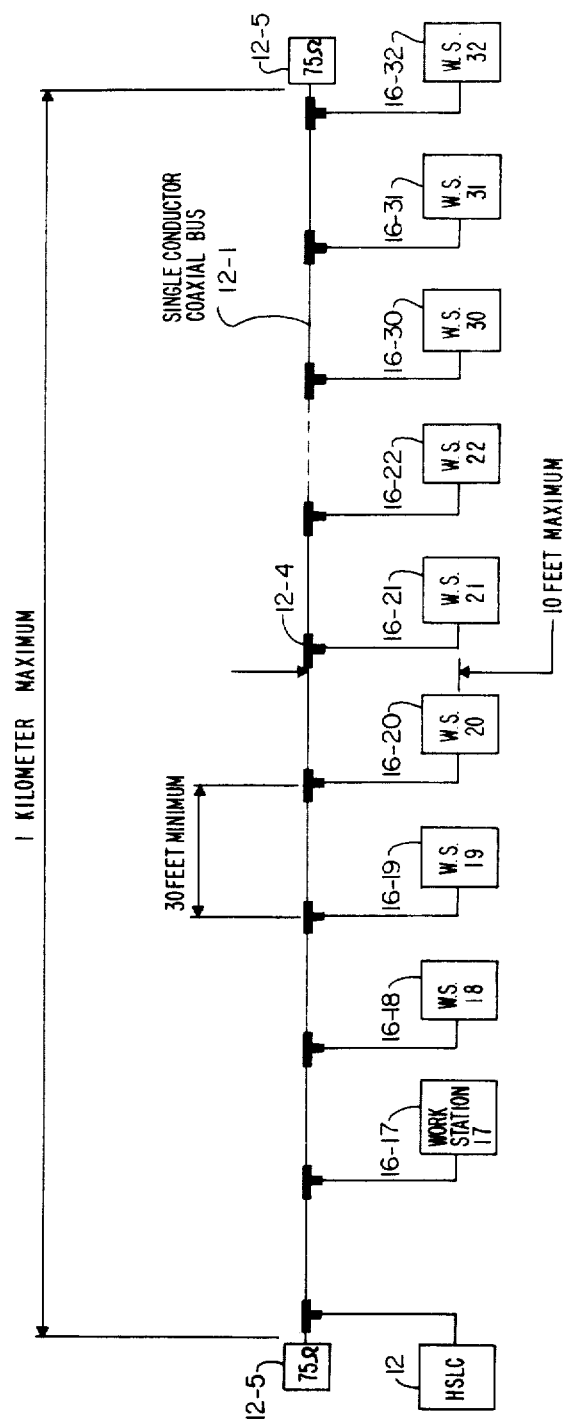
FIG. 11 is a diagram of the coaxial cable bus.

FIG. 11 shows details of coaxial bus 12-1 which couples work stations 16-17 through 16-32 to the HSLC 12. Work stations 16-33 through 16-48 are coupled to the HSLC 12 by coaxial bus 12-2 which is identical to coaxial bus 12-1. Each of the work stations 16-17 through 16-32 is coupled to the coaxial bus 12-1 by a BNC "TEE" 12-4 and a length of single conductor coaxial bus no greater than 10 feet in length. A length of greater than 10 feet will result in a reduced signal due to reflections. The cable length between adjacent BNC TEE's must also be greater than 30 feet to avoid a reduced signal due to reflections. Both ends of the coaxial bus 12-1 are terminated in a 75 ohm resistor between the shield which is grounded and the conductor to reduce reflections.

Typically, the coaxial bus is a Belden 9248 cable.

Figure 12:
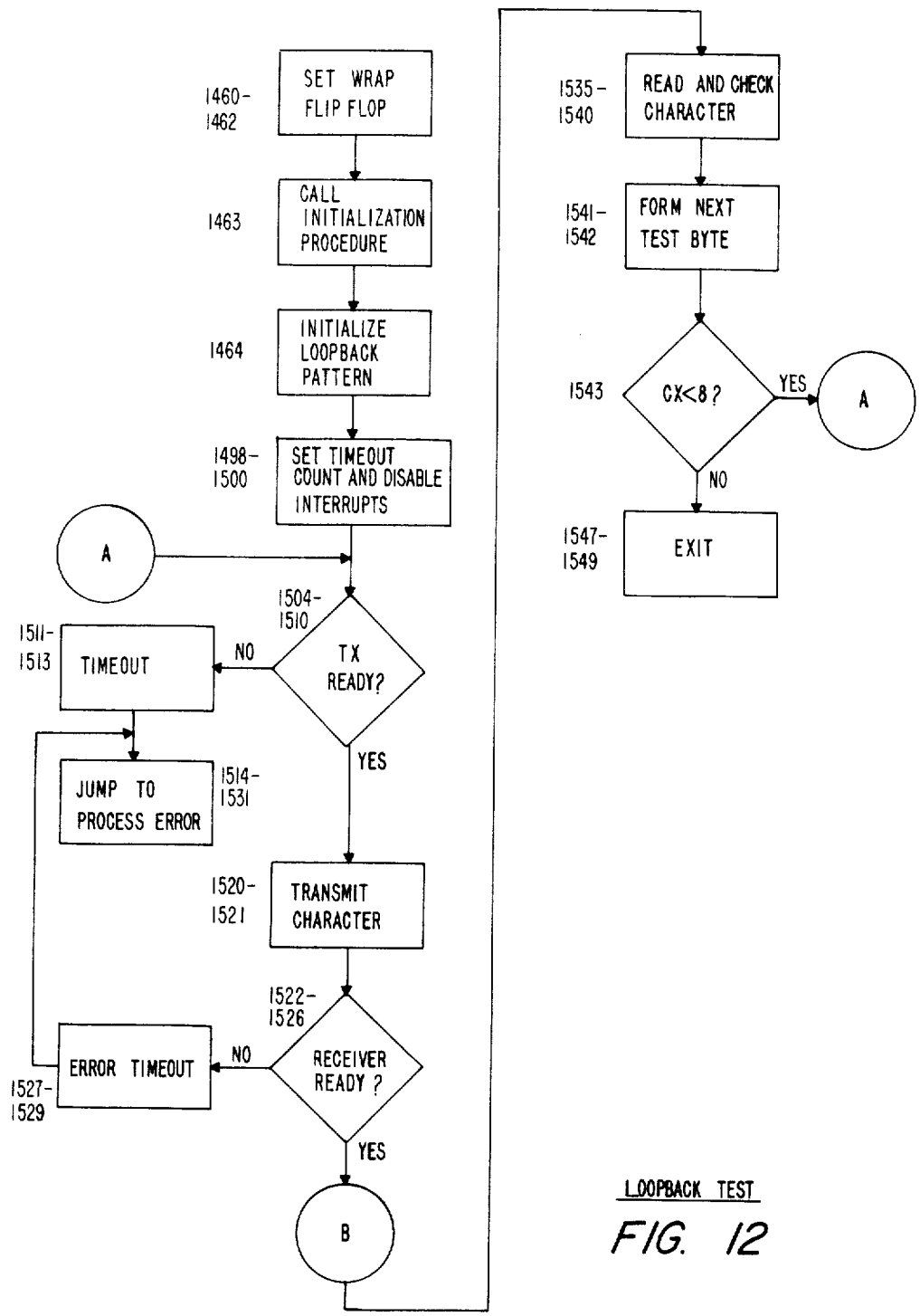
FIG. 12 is a flow diagram of the loopback test firmware.

The loopback firmware shown in FIG. 12 controls the HSLC 12 in performing the loopback test, that is, verifying that the HSLC 12 logic shown in FIG. 4 is operative. This test is performed independent of the work stations 16-17 through 16-45 of FIG. 1.

Block 1460-1462 sets the wrap flop 75-74 of FIG. 4 by generating address signals A4 through A7 which are applied to a decoder 75-70. Address signals A4 through A7 at logical ZERO generate signal WRAP 1 which sets flop 75-74 through a negative AND gate 75-72 when data signal D4 is at logical ONE and command signal $\overline{\text{IOWC}}$ W/OR from bus controller 38 is at logical ZERO. Output signal WRAP 2 from flop 75-74 selects the B input terminals of MUX 75-50.

During the normal transmit operation, the outputs of the STROBE flop 75-44 and the POLARITY flop 75-42, signals STROBE and POLARITY+, are applied to analog circuits 76 and 78.

During the loopback test, the STROBE signal is applied to an input of AND gates 75-6 and 75-8, the POLARITY+ signal is applied to an input of AND gate 75-6, and the POLARITY− signal is applied to an input of AND gate 75-8. The STROBE signal inputs to analog circuits 76 and 78 are grounded through a B terminal of MUX 75-50.

Block 1463 calls the initialization procedure by putting the communications controller 72 into the asynchronous mode. This permits the communications controller 72 to operate in a transmit/receive mode a byte at a time, that is, transmitting, receiving and checking the byte.

Block 1464 initializes the communications controller 72 in preparation for sending bytes which include a single binary ONE bit shifted one bit position on successive bytes.

Block 1498-1500 sets the timeout count and disables the interrupts. The timeout count will indicate a failure in the logic and cause a branch to a process error routine (block 1514-1531). Disabling the interrupts suspends work stations 16-17 through 16-48 operation for the duration of the loopback test.

Decision block 1504-1510 tests if the communications controller 72 is ready to accept a character from microprocessor 30 by testing the transmit buffer empty flag bit in an internal status register of the communications controller 72. If the transmit buffer remains full, then block 1511-1513 indicates a timeout condition and block 1511-1513 branches to a process error routine.

If the transmit buffer empty flag indicates that the buffer is empty, then in block 1520-1521 the microprocessor 30 transfers a byte D0-D7 to communications controller 72.

Decision block 1522-1526 loops on itself through error timeout block 1527-1529 until the receiver portion of the communications controller 72 is ready to receive the test byte. If no byte is received during the timeout period, the firmware branches to the process error routine, block 1514-1541.

Block 1535-1540, receives the byte which was originated in communications controller 72. Byte signals pass through flops 75-42 and 75-44, AND gates 75-6 and 75-8, MUX 75-50, registers 75-10 and 75-12, negative OR gate 75-56, and flop 75-34 and are received by communications controller 72 via signal RXD. Also, counter 75-16, adder 75-14, comparator 75-18 and decoder MUX's 75-20 and 75-21 cooperate as described supra to adjust the timing of the logic to the data bytes. The byte is transferred to the microprocessor 30 and verified against the transmitted byte.

Block 1541-1542 forms the next test byte in the microprocessor 30. Decision block 1543 checks the number of bytes transmitted and exits in block 1547-1549 when eight bytes were received. If less than eight bytes were received, then the firmware branches to decision block 1504-1510 to test the next byte.

FIG. 11A shows a section of the single conductor coaxial bus which includes a receiving end, a sending end, a "TEE connection", and a 10 ft. stub length. The receiving and sending ends are terminated in nominal impedance R, and the stub is open circuited.

Following is a simplified discussion relating to the amplitude of the reflections for step and ramp functions.

Assume that a V1 step function signal is applied to the coaxial bus (equation a, FIG. 11A), that the impedances of the receiving end, the sending end and the stub are equal to R (equation b), and that d equals the delay time of the step function signal from the "TEE" to the end of the stub (equation c). Then p, the reflection coefficient equals $-\frac{1}{3}$ (equation d). Therefore, the value of the reflection V2 at time t equals 0d is $\frac{1}{3}$ the amplitude of the V1 step function and in the reverse direction (equation e).

The value of the reflection at time t equals 2d, that is, 2 lengths of the stub is 1/9 the amplitude of the V1 step function (equation f).

Now assume a ramp of amplitude V1 and duration 8d which may be approximated by two steps of amplitude $\frac{1}{2}$ V1 and duration 4d (equation g). Then the amplitude of reflection V2 at time t equals 0d is $-1/6$ the amplitude of V1 (equation h). Note that this reflection has died out before the end of time equals 4d so there is no effect on the second step of amplitude V $\frac{1}{2}$. The amplitude of the reflection at time t equals 2d is 1/18 the amplitude of V1 (equation i).

As can be seen, the more steps the ramp waveform can be divided into in relation to d, the smaller the amplitude of the reflection since the reflection from one step dies out before the start of the next step.

When additional stubs are attached to the coaxial bus, the reflections are reduced by keeping the distance along the coaxial bus between stubs at least 3 stub lengths or 30 ft. apart; the reflections from one stub will die out before the reflections from the next stub can add to it.

Figure 13:
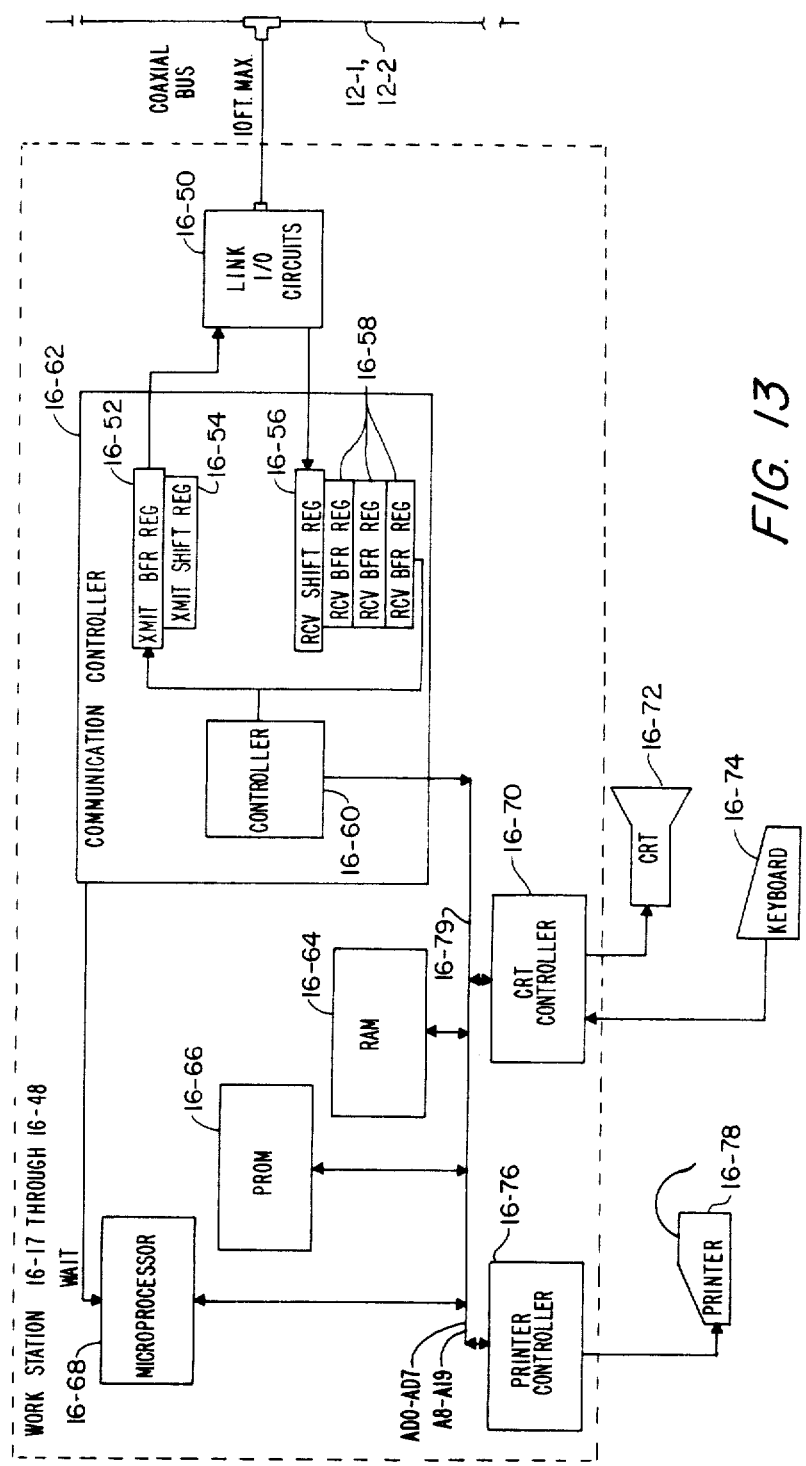
FIG. 13 is a block diagram of a work station.

FIG. 13 shows a block diagram of work stations 16-17 through 16-48 of FIG. 1. The work station includes a microprocessor 16-68, a programmable read only memory (PROM) 16-66, a random access memory (RAM) 16-64, a communications controller 16-62, all coupled in common to an address and data bus. Also included are link I/O circuits 16-50 and a CRT controller 16-70. A work station could include a printer controller 16-76 for controlling a printer 16-78. A cathode ray tube (CRT) display 16-72 and a keyboard 16-74 are coupled to the CRT controller 16-70.

The microprocessor 16-68 controls the work station operation by the use of microprograms stored in the PROM 16-66. The microprocessor 16-68 generates address signals AD0 through AD7 and A8 through A19 over bus 16-79 to address PROM 16-66 and reads the microinstructions over data signal lines AD0 through AD7. Information entered into the work station via the keyboard 16-74 is stored in the RAM 16-64 and displayed on the CRT display 16-72. Information received from the HSLC 12 via the coaxial bus 12-1 or 12-2 is stored in RAM 16-64 via the link I/O circuits 16-50 and communications controller 16-62. Serial data signals received by the link I/O circuits 16-50 are shifted into a receive shift register 16-56 and then transferred into a first in-first out (FIFO) receive buffer register 16-58 for storage in RAM 16-64.

The HSLC 12 polls each work station in turn. The addressed work station responds if it has a block of information stored in RAM 16-64 by putting the block of information out on coaxial bus 12-1 or 12-2. The information is transferred from the RAM 16-64 to the communications controller 16-62 via transmit buffer register 16-52 and loaded into the transmit shift register for serial transfer to the HSLC 12 via the link I/O circuits 16-50 and coaxial bus 12-1 or 12-2. The poll signals from the HSLC 12 include a flag character, an address character, a control character indicating a poll request, a cyclic redundancy check character and a closing flag character. The microprocessor 16-68 recognizes this as a poll request since the message received overflows the receive buffer register 16-58. The microprocessor 16-68 tests the communications controller 16-62 status registers described supra for the overflow and branches to a work station transmit microprogram (not shown).

Information transfers within the work station are controlled by the microprocessor 16-68. All activity within the communications controller 16-62 is under the control of a communications controller 16-62.

The microprocessor 16-68 is an Intel 8088 microprocessor, the communications controller 16-62 is an NEC μPD7201 circuit and the CRT controller 16-70 is a Motorola MC6845.

Normally the microprocessor is operating in a background mode, performing such operation or querying the keyboard 16-74 via the CRT controller 16-70 and storing keyboard characters, in RAM 16-64. Since the information received from the HSLC 12 is at 750,000 bits per second, a prepoll operation is necessary in order to condition the work station to receive a block of information. The HSLC 12 sends a flag character, a work station address, a cyclic redundancy check character and a flag character. This prepoll information gives the microprocessor 16-68 time to drop out of the background mode and branch using an interrupt vector to the microprogram routine in PROM 16-66 to be ready to receive the block of information.

Figure 14:
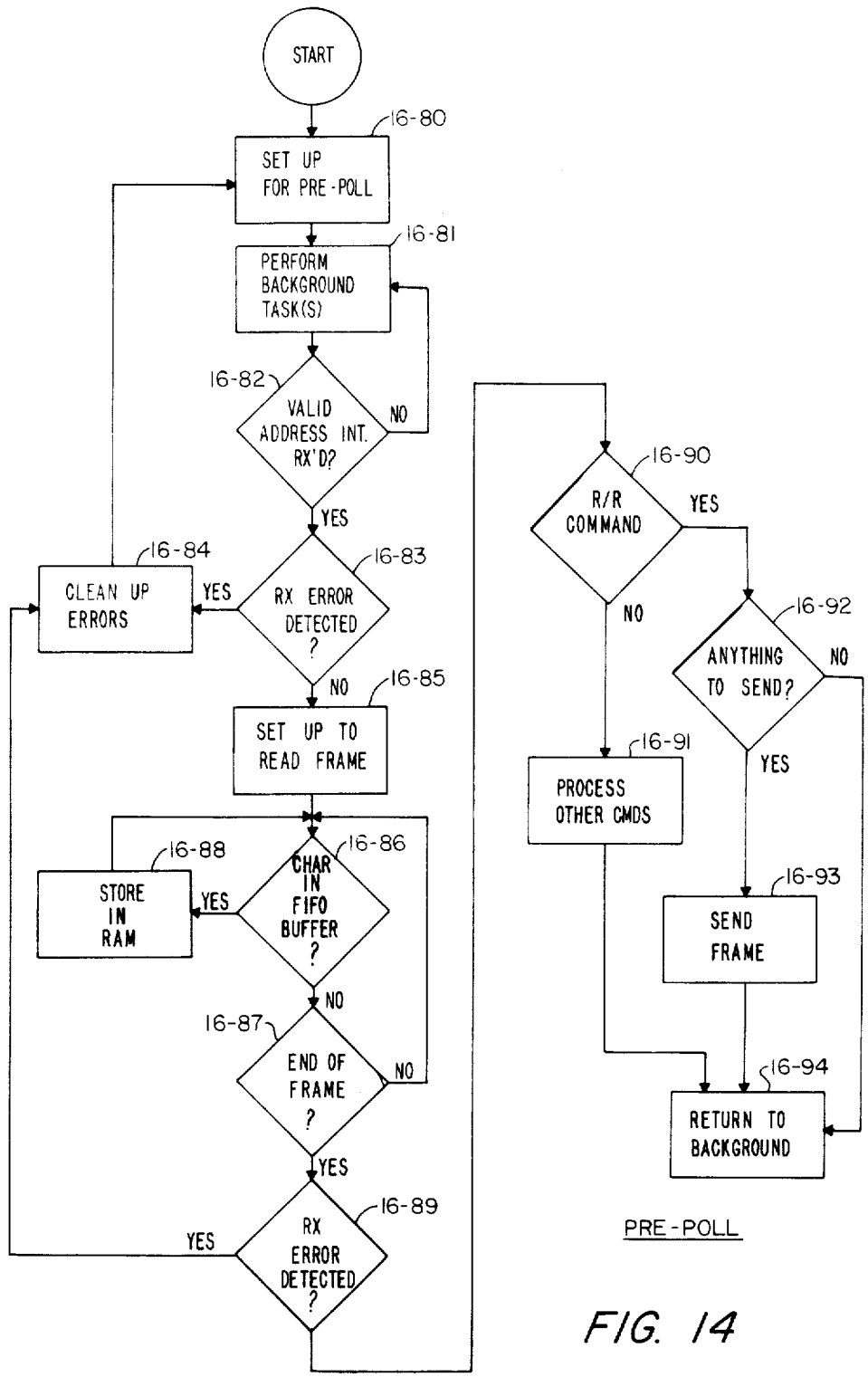
FIG. 14 is a flow diagram of the prepoll operation.

FIG. 14 shows a flow diagram of the prepoll microprogram stored in the PROM 16-66, FIG. 13, of work stations 16-17 through 16-48. The prepoll microprogram conditions the work stations during the power on sequence to initialize the communications controller 16-62 and to set up the interrupt vectors in the microprocessor 16-68 in block 16-80. Then in block 16-81, the microprocessor 16-68 is operative to perform the necessary background tasks such as querying the keyboard 16-74 and updating the CRT display 16-72.

Decision block 16-82 tests the communications controller 16-62 to determine if a message having the particular work station address was received from the HSLC 12. If the message received includes a flag byte, the work station address, and the cyclic redundancy check byte followed by a flag byte indicating a prepoll, then the communications controller 16-62 sends an interrupt request over the WAIT line, FIG. 13, to the microprocessor 16-68; immediately upon receiving the work station address, the microprocessor 16-68 then verifies that the remainder of the prepoll message was received correctly. The microprocessor 16-68 then branches to the microprogram that will process the message following the prepoll. If the address is not for this work station, then the communications controller 16-62 continues to search for the address that matches the work station address.

Decision block 16-83 checks if there was a cyclic redundancy check routine and branches to block 16-84 to process the error. If there is no error, then block 16-85 conditions the communications controller 16-62 to receive information bytes from the HSLC 12.

Decision block 16-86 tests the information byte received in the shift register 16-56 and transferred to the first in-first out buffer register 16-58. If a byte is in the buffer register, then in block 16-85 microprocessor 16-68 stores the byte in RAM 16-64 and branches to decision block 16-86 to fetch the next byte. If there is no byte in the buffer 16-58, then decision block 16-87 tests if the closing flag was received. If not, the microprogram branches to decision block 16-86 to await the next byte. If the closing flag was received, then an interrupt occurs to get out of the receive character loop of blocks 16-86, 16-87 and 16-88.

If the end-of-frame character was received, then decision block 16-89 performs the cyclic redundancy check and branches to block 16-84 if an error condition is sensed. The complete message received from the HSLC 12 is now stored in RAM 16-64.

Decision block 16-90 queries the work station if a request response command is set; and if set, the information is ready to send. If information is ready to send, then in block 16-93, under microprocessor 16-68 control, information is read from RAM 16-64 to the HSLC 12 via the transmit buffer register 16-52 to the transmit shift register 16-54 of the communications controller 16-62, the link I/O circuits 16-50 and the coaxial bus 12-1 or 12-2.

The work station then returns in block 16-94 to running the background microprograms.

I claim:

1. Apparatus for testing the logic of a high speed link controller comprising:

memory means for storing a microprogram;

microprocessor means coupled to said memory means and responsive to memory signals indicative of a plurality of microwords of said microprogram for generating a plurality of address signals, a first plurality of data signals, and a plurality of control signals;

wraparound test control means coupled to said microprocessor means and responsive to said plurality of address signals for generating a first wrap test signal;

communications controller means coupled to said microprocessor means and responsive to said plurality of control signals for serializing said first plurality of data signals into a first sequence of serial data signals, said communications controller further generating a cyclic receive clock signal timed in synchronization with said first sequence of serial data signals;

receiving means coupled to said communications controller and responsive to said cyclic receive clock signal and said first sequence of serial data signals for generating a sequence of first signals and a sequence of second signals representative of said first sequence of serial data signals; and synchronization means coupled to said receiving means and said wraparound test control means and responsive to said first wrap test signal and said first sequence of signals and said second sequence of signals for generating a second sequence of serial data signals;

said communications controller being coupled to said synchronization means and responsive to said second sequence of data signals for generating a second plurality of data signals;

said microprocessor means receiving said second plurality of data signals for verifying that said second plurality of data signals corresponds to said first plurality of data signals.

2. The apparatus of claim 1 wherein said wraparound test control means comprises:

first means responsive to said plurality of address signals for generating a second wrap test signal; and second means responsive to said second wrap test signal and a data signal from said microprocessor means for generating said first wrap test signal.

3. The apparatus of claim 2 wherein said receiving means comprises:

third means responsive to said first sequence of serial data signals and said cyclic receive clock signal for generating said sequence of first signals for each of said plurality of data bits indicative of a ZERO data bit; and fourth means responsive to said first sequence of serial data bits and said sequence of first signals for generating said sequence of second signals indicative of alternate ones of said sequence of first signals.

4. The apparatus of claim 3 wherein said synchronization means comprises:

fifth means responsive to said first wrap test signal, said sequence of first signals, and said sequence of second signals for generating a sequence of receive gate signals;

sixth means for generating a clock signal;

seventh means responsive to said clock signal for generating a repeating sequence of clock count signals and responsive to said sequence of receive gate signals for modifying said clock count signals wherein said sequence of receive gate signals are received when said clock count signals indicate a predetermined count; and eighth means responsive to said modified clock count signals and said sequence of receive gate signals for generating said second sequence of serial data signals.

5. The apparatus of claim 2 wherein said first means is a decoder.

6. The apparatus of claim 2 wherein said second means is a flop.

* * * * *